United States Patent [19]

Hamada et al.

[11] Patent Number: 5,196,881
[45] Date of Patent: Mar. 23, 1993

[54] AUTOMATIC FOCUS CONTROL DEVICE

[75] Inventors: Masataka Hamada, Osaka; Tokuji Ishida, Daito; Kenji Ishibashi, Sakai; Nobuyuki Taniguchi, Nishinomiya; Hiroshi Ootsuka, Sakai, all of Japan

[73] Assignee: Minolta Camera Kabushiki Kaisha, Osaka, Japan

[21] Appl. No.: 741,785

[22] Filed: Aug. 6, 1991

Related U.S. Application Data

[60] Division of Ser. No. 508,274, Apr. 11, 1990, Pat. No. 5,040,015, which is a division of Ser. No. 374,590, Jun. 28, 1989, Pat. No. 4,924,250, which is a continuation of Ser. No. 247,079, Sep. 20, 1988, abandoned, which is a division of Ser. No. 32,738, Mar. 30, 1987, Pat. No. 4,816,856.

[30] Foreign Application Priority Data

Mar. 31, 1986 [JP] Japan .................. 61-74580

[51] Int. Cl.⁵ .............................................. G03B 13/36
[52] U.S. Cl. ................................................. 354/402
[58] Field of Search ................ 354/400, 402, 403, 406, 354/407, 408, 195.1

[56] References Cited

U.S. PATENT DOCUMENTS

| | | |
|---|---|---|
| 4,387,975 | 6/1983 | Hamada .............................. 354/400 |
| 4,466,726 | 8/1984 | Nakajima . |
| 4,470,683 | 9/1984 | Nakajima . |
| 4,538,892 | 9/1985 | Sakai et al. . |
| 4,671,640 | 6/1987 | Akada et al. . |
| 4,860,045 | 8/1989 | Hamada et al. . |

FOREIGN PATENT DOCUMENTS

| | | |
|---|---|---|
| 57-185423 | 11/1982 | Japan . |
| 56-78823 | 6/1983 | Japan . |
| 60-107011 | 11/1983 | Japan . |
| 60-214325 | 10/1985 | Japan . |

Primary Examiner—Russell E. Adams
Attorney, Agent, or Firm—Price, Gess & Ubell

[57] ABSTRACT

In an automatic focus control device of a camera there are provided defocus amount calculation means for calculating a defocus amount for a predetermined focus plane of a photographic lens in the camera on the basis of the electric signal generated by a light receiving means, comparing means for comparing the obtained value on the basis of the calculated defocus amount with a reference value, control means controlling driving speed of the photographic lens by the lens driving means in response to the comparison result of a comparing means, photographic condition setting means for setting the photographic condition and reference value setting means for setting said reference value in response to the set photographic condition.

12 Claims, 30 Drawing Sheets

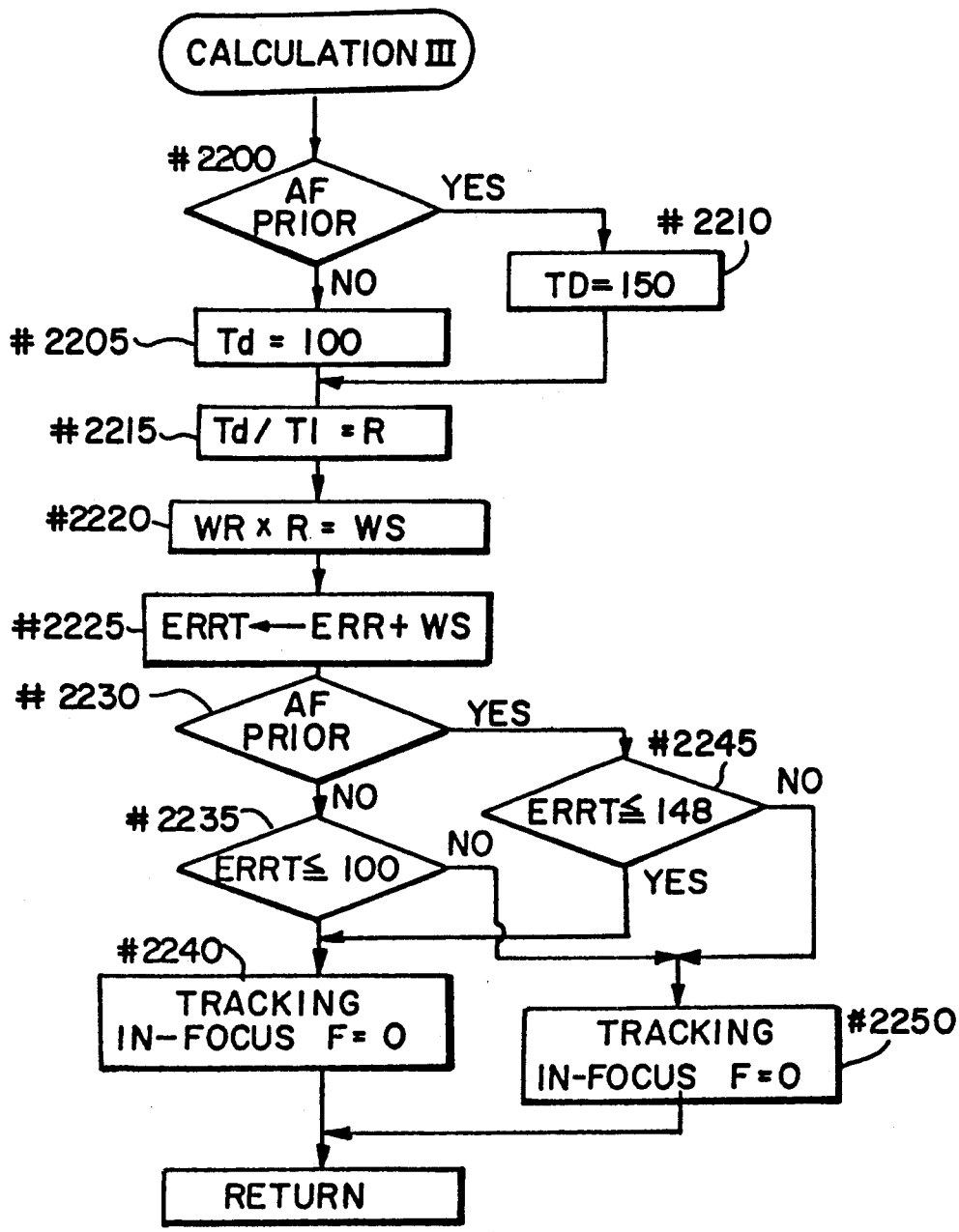

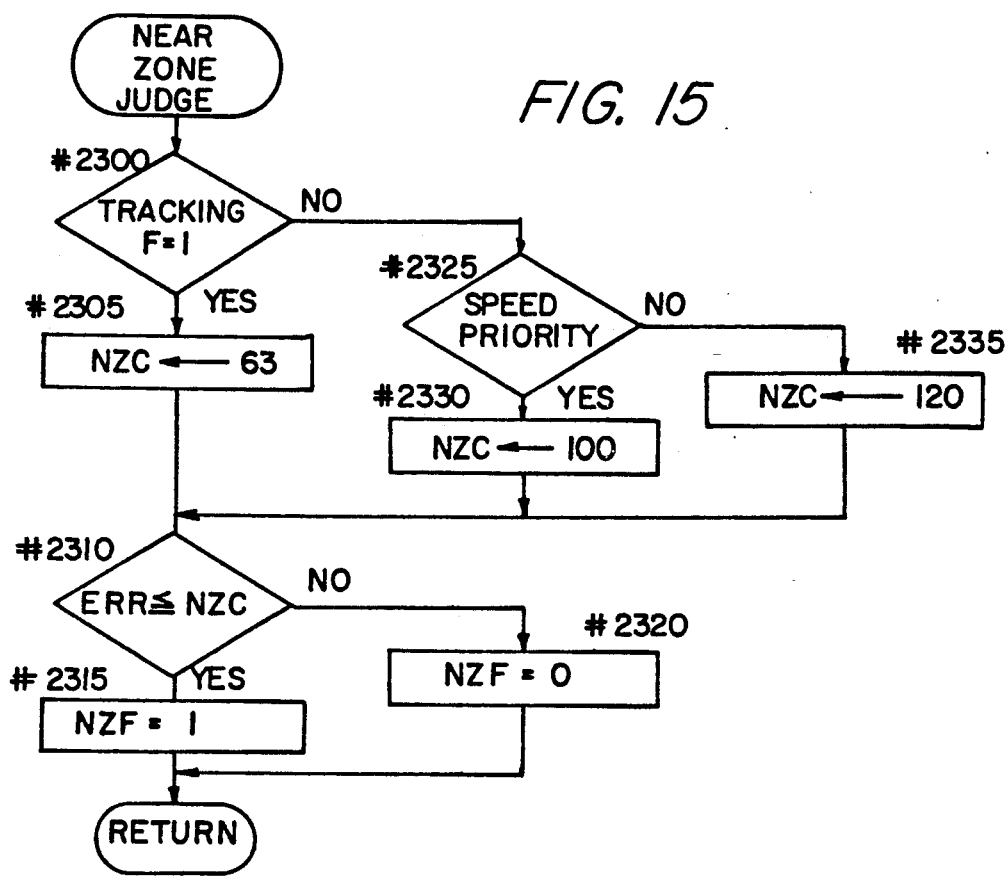
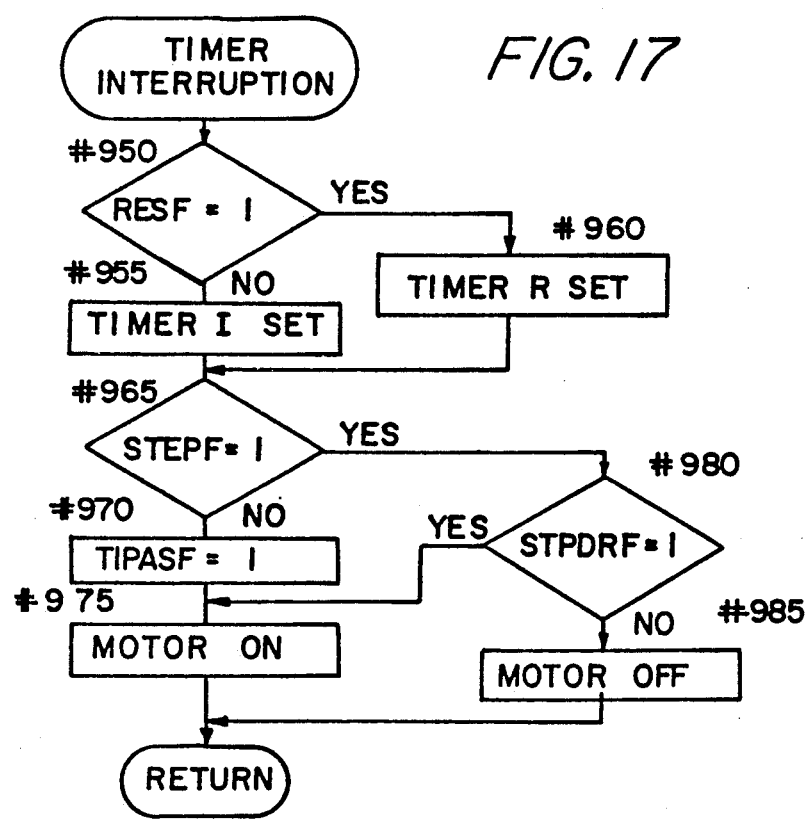

AUTOMATIC FOCUS CONTROL DEVICE

This is a division of prior application Ser. No. 508,274 filed on Apr. 11, 1990 which will issue on Aug. 13, 1991 as U.S. Pat. No. 5,040,015 for an AUTOMATIC FOCUS CONTROL DEVICE which is a divisional of prior application Ser. No. 374,590, filed on Jun. 28, 1989, now U.S. Pat. No. 4,924,250 which is a continuation of abandoned U.S. Ser. No. 247,079, filed on Sep. 20, 1988, which is a divisional application of prior application Ser. No. 032,738 filed on Mar. 30, 1987 and issued on Mar. 28, 1989 as U.S. Pat. No. 4,816,856.

BACKGROUND OF THE INVENTION

1. Field of the Invention

The present invention relates to an automatic focus control device of a camera, particularly to an automatic focus control device in which a photographic lens is moved in various kinds of modes.

2. Description of the Prior Art

There has been already proposed a focus detection device for use in a camera in which two images are formed by focusing light bundles which comesfrom an object to be focused passing through a first and second areas of a photographic lens of the camera which have symmetrical relation to an optical axis of the photographic lens and each other and the mutual relationship of the two image positions is calculated and the amount and the direction of the defocus of the image from the predetermined focal plane can be obtained. Thus, it can be detected whether the image position is in the front side or in the back side of the predetermined focal plane, in other words, in front focus condition or in rear focus condition. The optical system of the focus detection device mentioned above is shown in FIG. 1, wherein the optical system comprises a condenser lens 6 located on a predetermined in-focus plane at the back of a photographic lens 2 located further behind said focal plane 4 two re-focus image lenses 8 and 10 behind of the condenser 6 and two image sensors 12 and 14 of CCD light receiving elements on the focal plane of the refocus image lenses 8 and 10 respectively.

As shown in FIG. 2, the images on image sensors 12, 14 draw near each other close to an optical axis 18 in case of the front focus condition in which the image of the object is focused in the front side of the predetermined focal plane, and the images on the image sensors 12, 14 are respectively focused in the position apart from the optical axis in case of the rear focus condition in which the image of the object is focused in the back side of the predetermined focal plane. In case the image of the object is focused in the focal plane, the distance between two corresponding image points on the image sensors 12, 14 corresponds to a predetermined distance defined by the structure of the optical system of the focus detection device. Accordingly, the focus condition can be theoretically obtained by detecting the distance between the two corresponding image points on the image sensors 12, 14.

In an automatic focus control device of a camera, comprising the focus detection optical system mentioned above, there has been used a microcomputer for performing various camera controls such as the integration of the brightness value of the object by CCD image sensor, the calculation of the focus detection or the calculation of the defocus amount and the defocus direction using the CCD image sensor output, the lens movement corresponding to the calculated defocus amount stopping the lens movement in the in-focus position and the shutter release operation.

When the photographic lens is shifted near the in-focus position, the automatic focus control device repeats the sequential automatic focus control operation consecutively and executes a consecutive automatic focus control so that the in-focus condition can be correctly set finally.

By the way, in the automatic focus control device mentioned above, in case the object is closing to the camera or going far away from the camera, even if the automatic focus control operation is performed causing the photographic lens to be moved to the in-focus position on the basis of the detected defocus condition with one time focus detection, the camera can not be set in the in-focus condition for the object because the object is moving during the automatic focus control operation.

FIG. 3 is a graph showing a relation between the time of the horizontal axis and the defocus amount on the photographic film plane in the camera of the vertical axis. In FIG. 3 a curve 1 shows a change of the actual defocus amount on the photographic film when the object is closing to the camera, and a line m shows the defocus amount obtained by converting the object distance of the photographic lens controlled by the automatic focus control device into the corresponding defocus amount.

Periods of time for taking in the object data in the microcomputer are represented by A to D in the middle of the respective integration times of the image sensor respectively. In FIG. 3, $T_0$ denotes a center point of the first integration time and $D_0$ denotes the defocus amount at the time period $T_0$. The time interval between $T_0$ to $T_1$ is the necessary time for the calculation of the focus detection from the center point $T_0$ to the end of the integration time. When the movement of the photographic lens is completed, the photographic lens is stopped and the next integration during the time periods $T_2$ to $T_3$ and the calculation during the time period $T_3$ to $T_4$ are executed. At the time $T_2$ of stopping of the photographic lens, the object has already moved and the defocus amount $D_1 - D_0$ has occurred compared with the defocus amount at the time $T_0$. At the time $T_3$ the data of the object is taken-in and at the time $T_5$ the defocus amount ($D_2 - D_1$) is calculated and the movement of the photographic lens is finished. At this time $T_5$ the object has already moved and even if the movement of the photographic lens is finished, the defocus amount ($D_3 - D_2$) is occurred and increases larger than the defocus amount at the time $T_2$. Similarly in the following, at the time $T_8$ the defocus amount is ($D_5 - D_4$), at the time $T_{11}$ the defocus amount is ($D_7 - D_6$) etc. the photographic lens goes far away from the in-focus condition and a delay of the tracking of the photographic lens against the movement of the object occurs in spite of the automatic focus control operation whereby a shutter release operation in the in-focus condition can not be completed.

The tracking delay of the lens under the automatic focus control causes a problem especially in case there is adopted an interchangeable having a long focal length, lens such as a telephoto lens having a slow focusing speed.

The applicant of the present application proposed one way of solving the problem mentioned above. The summary of the way is explained with reference to FIG. 4. Assuming that three defocus amounts DFB, DFC and DFD respectively at respective times of integration I2, I3 and I4 are shown as DFB<DFC<DFD, the next new defocus amount is calculated by adding the difference Z between the defocus amount DFD and the defocus amount DFC, whereby the tracking delay for the moving object can be reduced. In FIG. 4 the defocus amount at the time of stopping the photographic lens or at the time of starting the integration I5 can be reduced from X to Y by adding the difference Z between the two defocus amounts DFC and DFD.

However, in the proposed way mentioned above, only the delay of the defocus correction can be compensated. This means, however, that the proposed way is effective only to prevent an excessive correction of the defocus, therefore there sometimes occurs that the revised defocus amount is not sufficient. Judging from the defocus amount it can be seen whether the speed of the movement of the object on the film plane is fast or slow.

SUMMARY OF THE INVENTION

An essential object of the present invention is to provide an automatic focus control device for use in a camera system in which a photographic lens can be automatically set in an in-focus position even if an object to be focused is moving.

Another object of the present invention is to provide an automatic focus control device for use in a camera system in which the photographic lens can track correctly a moving object so that an in-focus photograph can be readily obtained.

The present invention is provided for calculating the correct compensation of the defocus amount by giving a value to the compensation and the amount of the compensation is calculated as the amount of the movement of the object per one cycle of the calculation of the focus detection and the value is added to the defocus amount, whereby the tracking ability can be improved. And in the next cycle, the lens is set in the in-focus condition. However, in case the moving speed of the object is faster than the focusing speed of the photographic lens, or in case the object is moving with an acceleration, the camera is not set in focus condition but the tracking ability for the object in the present invention is higher than the tracking compensation way mentioned before since the movement of the object is detected.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIGS. 8 to 24 are flow charts showing the actions of the device shown in FIG. 5.

DETAILED DESCRIPTION OF THE PREFERRED EMBODIMENT PRINCIPLE OF THE INVENTION

Figure 3:
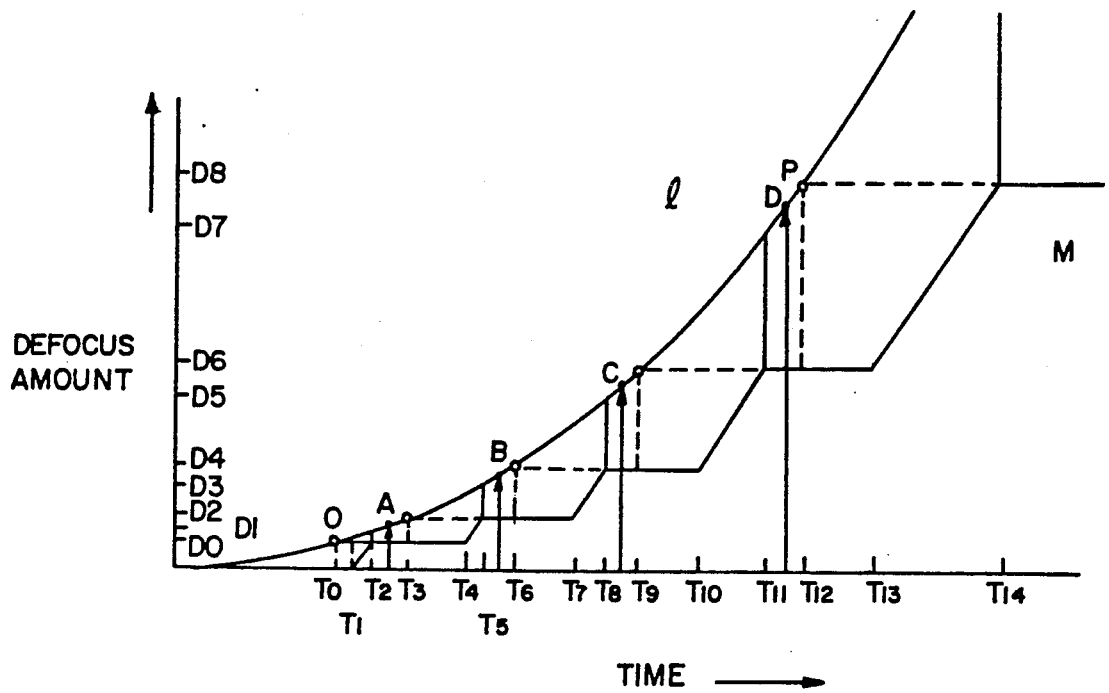
FIGS. 3 and 4 are diagrams showing the principle of the tracking compensation of the prior art.
Figure 4:
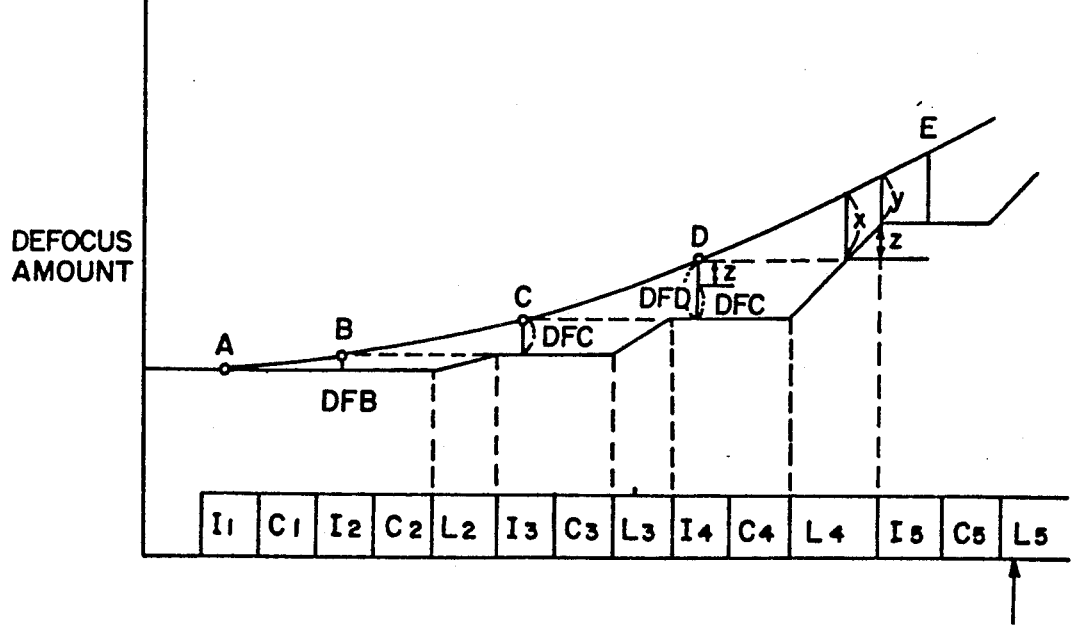
Figure 28:
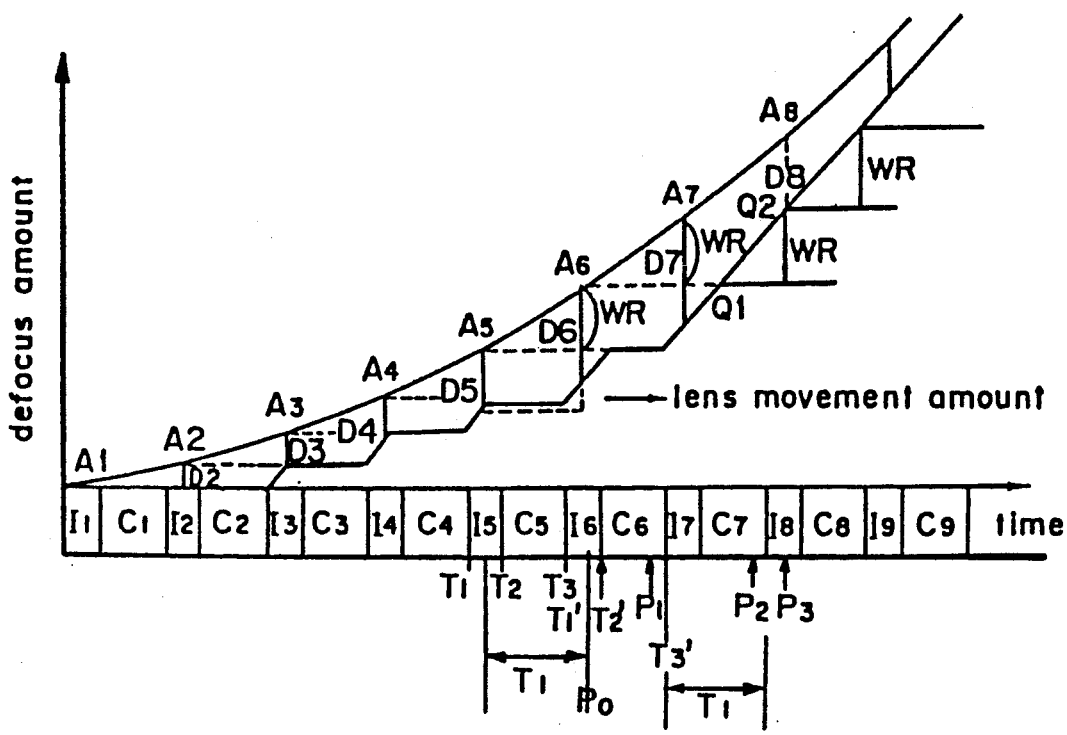
FIGS. 28 to 31 are diagrams showing the principle of the tracking recision according to the present invention.

FIG. 28 is a graph for explaining the principle of an example of the present invention, in which the vertical axis and the horizontal axis have the same meanings as shown in FIG. 3. When it is judged on the basis of defocus amounts D5, D6 at the time period P1 during the period of stopping of the photographic lens that a delay of the shift of the photographic lens to track the moving object (referred to as tracking delay hereinafter) occurs, a tracking compensation is ordered at the time P1 by the calculation C6 of the integral time I6 and the photographic lens is not stopped at the time period P1 but moved to a point Q2 for an amount WR of compensation of the lens shift (referred to as compensation amount). The compensation amount WR is represented by the defocus amount on the photographic film plane corresponding to the amount of the movement of the object along the direction of the optical axis of the photographic lens of the camera. The amount of the movement of the photographic object is preliminarily converted in terms of inclination per a unit cycle TI of the focus detection operation.

In FIG. 28, it is regarded that the next time of the moving of the photographic lens is TI and the photographic lens can track the movement of the object within the time period TI at the latest. The possibility exists that the object moves at such a high speed that the photographic lens is needed to be moved more than the compensation amount WR within the time period TI. In this case tracking delay occurs but in case the photographic object is not moving in an extremely high speed, the photographic lens can be set in the area which can be deemed as an in-focus condition. In this example of the tracking compensation, however it is assumed that the amount of the movement of the object is represented by a simple function of the defocus amount on the photographic film plane, actually for example, in case the object is closing to the camera in a constant speed, the defocus amount corresponding to the movement is not represented by a simple function but by a high dimensional function. Also in this case, even if the defocus amount is revised by tracking, the amount of compensation is insufficient but since the photographic lens is set in the in-focus area, it can be said that the photographic lens is tracking. In FIG. 28, the proposed position of compensation is a center point P3 of the integration time I8.

Since the photographic lens is not moved from the time of the center point P0 of the integration time I6 to the end time P1 of the calculation C6, during this period the tracking delay of the photographic lens with respect to the object occurs. Accordingly, the amount of this delay and the amount of the delay during the movement of the lens (in this period one cycle of the integration and calculation is included) should be considered. In other words, in case the object moves and a tracking delay occurs during stopping of the photographic lens, it is necessary that the defocus amount is revised at the time P1 expecting the movement of the object from the integration I6 to the center point of the integration I8 through I7. In this case, the necessary amount of the compensation of the defocus amount to be added is 2WR at the point P1.

The center point P3 of the integration I8 has a generally same meaning as the desired time point P2 where the result of the next data I7 comes in seeing from the point P1, that is, since the integration time is short, the desired points P2 and P3 are regarded as P2−P3. It takes 50 m sec. for the calculation C but below a few m sec. for the integration I.

Figure 29:
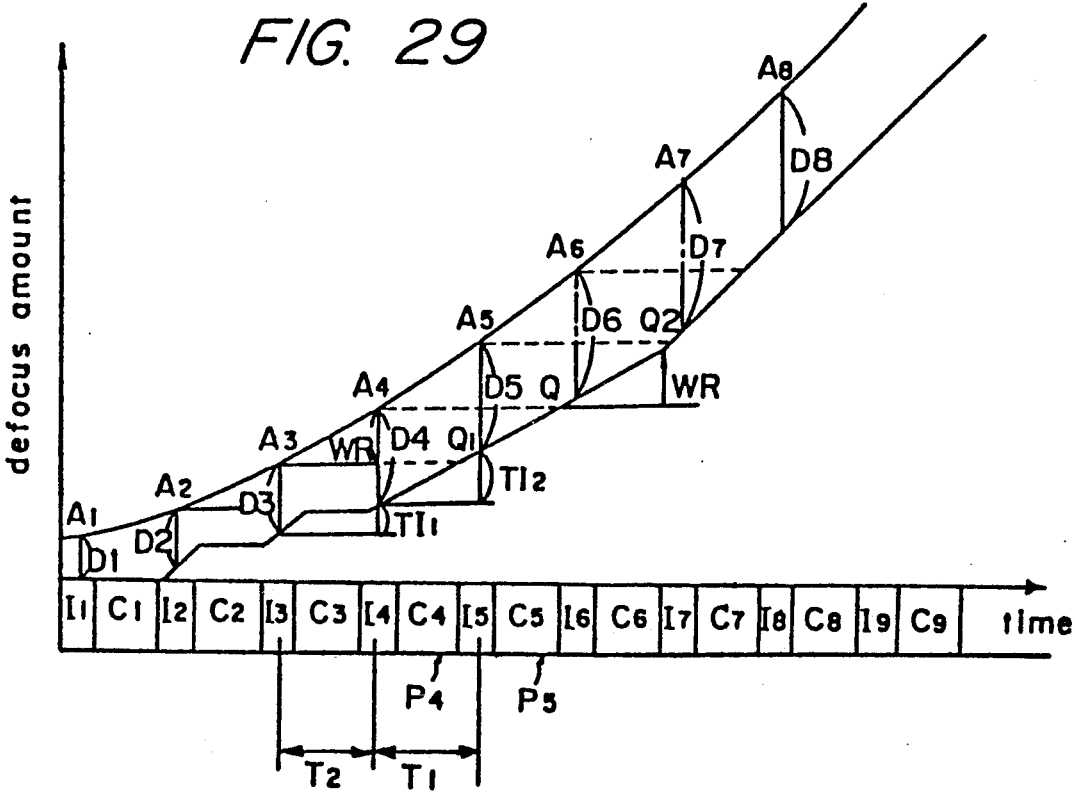

FIG. 29 shows the case of judging on the basis of the defocus amounts D3 and D4 that a tracking delay occurs for the object at the time P4 during the movement of the photographic lens. Furthermore, FIG. 29 shows the condition that the photographic lens is moving under the condition that a tracking compensation is consecutively performed while the photographic lens tracks the object under the tracking mode, including the case of judging to enter in the tracking mode during the stopping of the photographic lens. In case the control operation goes to the tracking mode at the time P4 and the compensation is ordered, the photographic lens is moved up to such an extent as to the defocus amount calculated based on the data obtained in the integration time I3, and even after the movement of the photographic lens is completed, the photographic lens is not stopped at the point Q1 but is moved the amount of 2WR. As well as in FIG. 28, the designation point of the compensation is the center point of the integration I7 near the point P6 where the result calculated based on the data of the next integration I6 is obtained. The period from the center point of the integration I4 where the tracking delay is detected to the center point of the integration I6 equals two cycles of the focus detection and calculation. This means that the amount of the movement of the photographic lens is revised corresponding to the amount of two cycles in the period of one cycle when the next result of the integration is obtained. Subsequently, similar operation is repeated, however, in case the movement of the photographic lens can not compensate the defocus amount, that is, in case the amount of the movement count added by a compensation is larger than the predetermined count value in the tracking mode, the shift speed of the photographic lens is switched. In FIG. 29 the shift speed of the photographic lens is switched at the point Q2. Even if the shift speed is switched, the compensation value and the destination value is not changed. In case the photographic lens reaches the in-focus position for the object and the direction of the photographic lens is reversed by the result of the calculation, the tracking compensation of the movement of the photographic lens is stopped.

Figure 30:
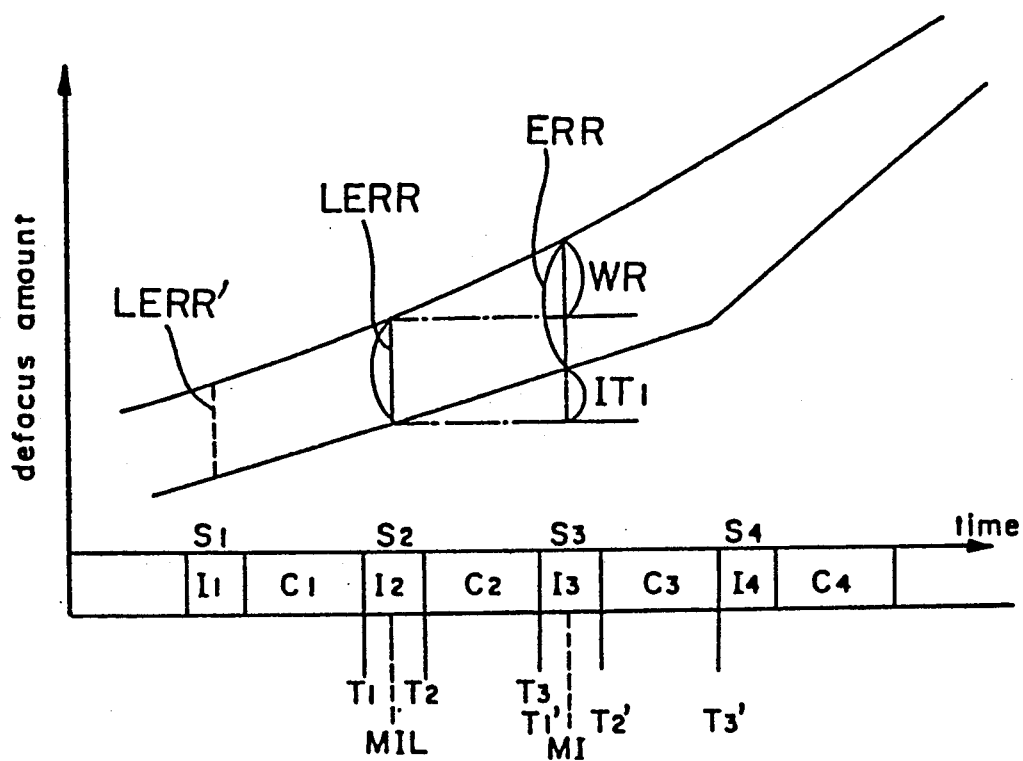

With reference to FIG. 30, there is explained the way of calculating the inclination per a unit cycle TI of the focus detection for the movement of the object in the direction of the optical axis of a camera.

In FIG. 30, the unit cycle of the focus detection are S1-S2, S3-S4, T1-T3, T1'-T3' etc., which are consecutive and are regarded as the same period with respect to the same object. The present position is in the calculation C3 and the defocus amount obtained by the former integration is LERR, which is calculated at the time of T3. ERR denotes the defocus amount calculated by the present integration, and the defocus amount ERR is obtained at the time T3'.

The defocus amount corresponding to the amount of the movement of the object per a unit cycle or the inclination WR is obtained as follows referring to FIG. 30, $$WR = ERR + ITI - LERR,$$

wherein ITI is the amount of the movement of the photographic lens during the period from the last integration to the present integration. A relative lens position in the central point of the last integration is obtained as ½ of the sum of the positions of the integration starting time T1 and T2 are the integration ending time T2. The values T1 and T2 are the values that the defocus amount LERR at the time of S1 is converted into the count number of the movement of the photographic lens during the calculation C1 and is set in a event counter. On the other hand, a focusing encoder is set in the photographic lens and when the lens moves, a pulse train is generated from the encoder. The pulse signal line is connected to the input of the event counter and the event counter counts down every time the pulse signal is transmitted to the event counter. Therefore, the shift amount of the photographic lens can be obtained by reading the value of the event counter, and the shift amount are expressed as T1 and T2. The center point of the last integration is obtained as follows $$(T1 + T2)/2 = MIL,$$

Figure 31:
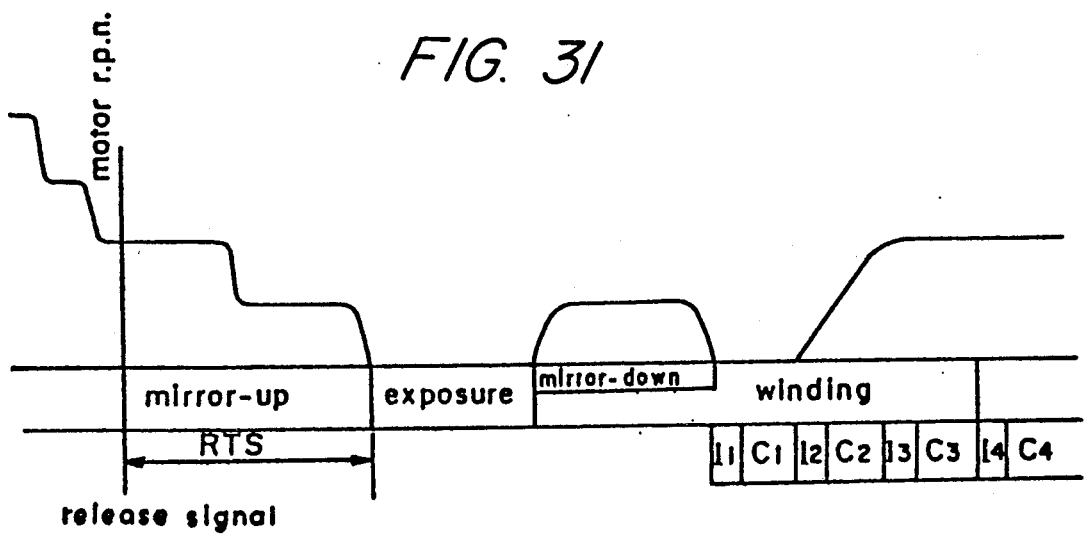

With reference to FIG. 31, the case is explained that a camera shutter is released during the automatic focus control operation in the tracking mode mentioned above. In operation of the present invention, the photographic lens is moved in a release time lag in order to improve the lens tracking ability. That is, in the period from receiving of a release signal to starting exposure at a period of time of the reflex mirror-up in a single lens reflex camera, the photographic lens is moved. In the mirror-up period mentioned above, according to the focus detection way using the light received through the reflex mirror, the focus detection, integration and calculation can not be executed since the reflex mirror is in a raised position. Therefore, the amount WS of the movement of the object is preliminarily calculated during the mirror-up operation. Assuming that a release time lag is RTS, $$WS = WR \times RTS/TI,$$

which is the amount of the tracking compensation and the photographic lens is moved and stopped before the exposure depending on the amount WS of the tracking compensation. After the exposure on the film, when the reflex mirror is dropped down, the film winding of a predetermined length of a frame is automatically started and the shutter charge is started. It is not necessary that the winding is performed automatically.

Assuming that the camera is set in a release priority mode in which the camera shutter release can be performed with a priority under the condition that the camera is not in the in-focus condition and the shutter is released before the photographic lens is focused. As a result, a blurred photograph will be taken. However, when the camera is in a continuous advance mode, it is desirable that the photographs taken after the first photograph become in-focus state. Hence, during the mirror-down in the period the integration and the calculation can not be started before the mirror is settled at the bottom position, the photographic lens is moved only the amount corresponding to the insufficient amount for the focus input settlement at the time of exposure before the integration is started. In FIG. 31, the photographic lens is stopped at the time of starting of the integration, but the integration may be executed simultaneously with the lens moving.

SPECIFIC FEATURES OF THE PREFERRED EMBODIMENT

Figure 5:
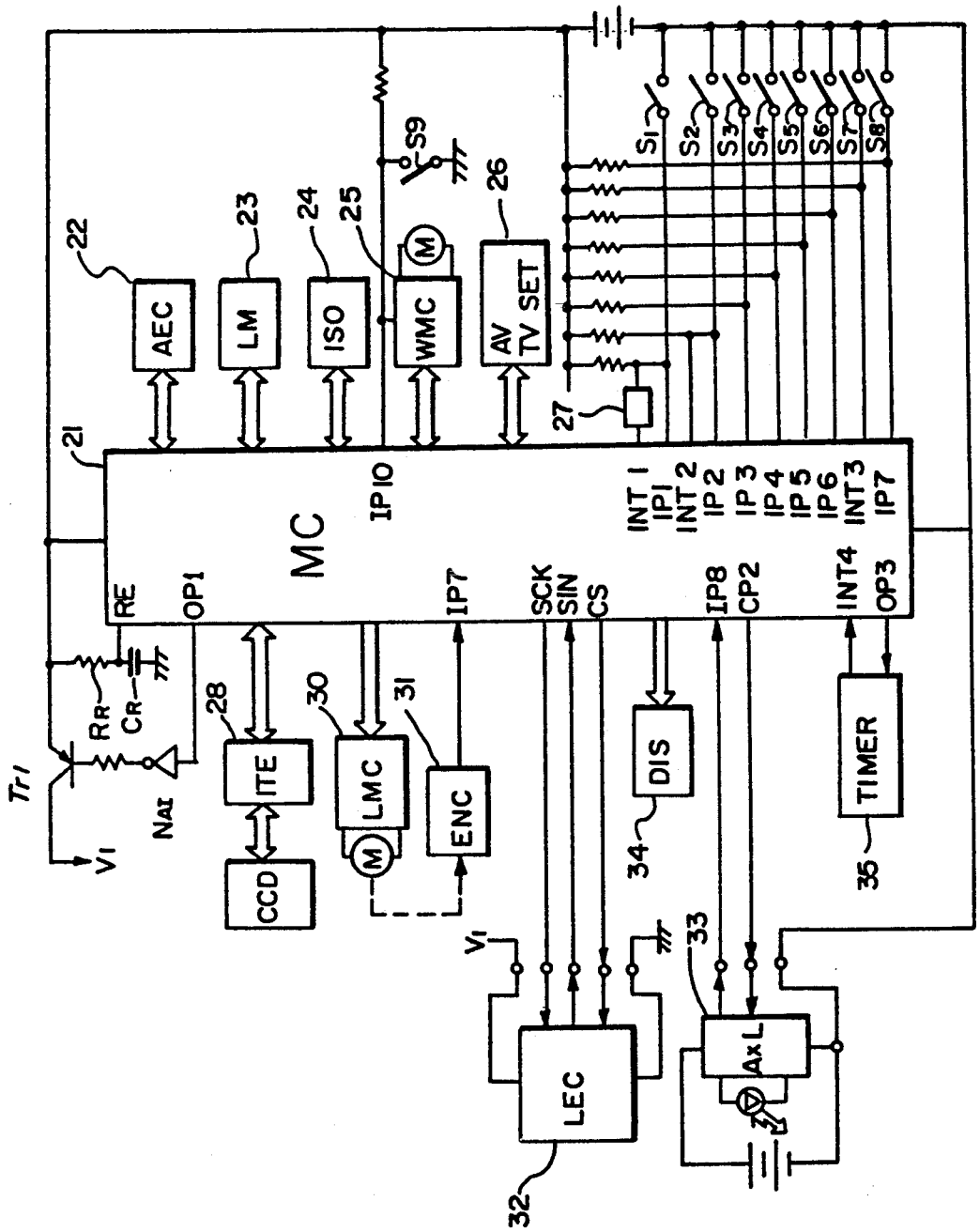
FIG. 5 is a block diagram showing an embodiment according to the present invention.

Referring to FIG. 5, there is provided a microcomputer 21 for the camera sequence control and the calculation used in the camera. An exposure control circuit 22 controls opening and closing the shutter respectively in response to exposure starting signal and ending signal fed from the microcomputer 21, mirror-up operation and diaphragm control operation in response to a mirror-up signal. A light measurement circuit 23 converts an analogue signal corresponding to the brightness value of the object into a digital form and sending the digital signal to the microcomputer 21. A film sensitivity reading circuit 24 detects the film sensitivity and converts the film sensitivity information in a digital form to send it to the microcomputer 21. An one frame winding circuit 25 controls a film winding motor (not shown) for winding one frame of a photographic film installed in the camera (not shown) in response to a signal fed from the microcomputer 21 and stops the film winding motor when an one frame winding detection switch S9 is turned on. A setting circuit 26 is provided for setting an aperture value and a shutter speed of the camera. A pulse generating circuit 27 generates one pulse when a release switch S1 is turned ON or OFF. An interface circuit 28 is disposed between CCD 29 and the microcomputer 21 for controlling of starting and finishing of charging in CCD 29 corresponding to the signal from the microcomputer 21 and for analog to digital conversion of the data from CCD 29 and transmitting the data to the microcomputer 21.

A motor control circuit 30 is provided for controlling a lens drive motor M for driving a focusing component including the photographic lens (not shown) for the focus control in response to the signal fed from the microcomputer 21. 31 is an encoder for monitoring the rotation of the lens drive motor M, which generates sixteen pulses every time the motor M rotates one rotation. A lens circuit 32 is disposed in the photographic lens, sending peculiar data of each lens to the microcomputer 21. A auxiliary light emitting device 33 acts to emit a light beam toward the object at the time of the focus detection. 34 denotes a display circuit for displaying the focus detection condition. A timer 35 generates a release signal at a predetermined interval in the continuous advance mode in which the consecutive photograph is repeated. E is a power source battery for providing a power source directly to the microcomputer 21, switch as mentioned below, a reset resistor $R_R$, a reset condenser $C_R$ and a transistor Tr1 for supplying. The voltage of the battery is supplied via the transistor Tr1 to other circuits except the above mentioned circuits.

Figure 1:
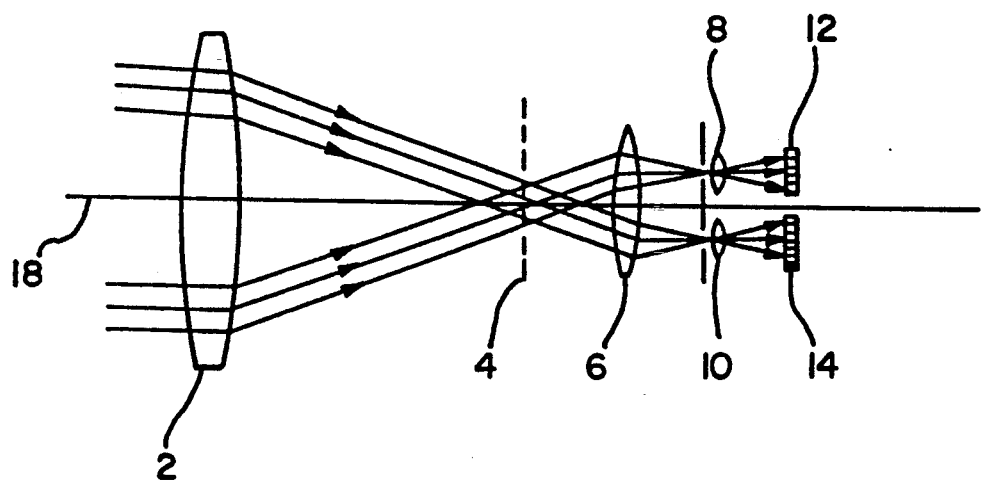
FIGS. 1 and 2 are schematic diagrams showing the principle of the focus detection.

The function of the various switches used in the circuit arrangement shown in FIG. 1 is hereinafter explained. The release switch S1 is turned on when the release button (not shown) in the camera is depressed to a first stroke and the microcomputer 21 executes an automatic focusing routine AFS as described below in response to turn on and turn off of the release switch S1. A switch S2 is turned on when the release button is depressed to the second stroke which is longer than the first stroke, whereby the microcomputer 21 executes the release routine shown in FIG. 20a as described below. A switch S3 is turned on at the time of mirror-up completion and is turned off when a shutter release member (not shown) of the camera is charged by winding the photographic film by the one frame winding device 25. A switch S4 selects either a one shot mode in which when the photographic lens is reached to its in-focus condition once, the focus detection thereafter is stopped holding the photographic lens in the in-focus position or a continuous mode in which even if the photographic lens is once focused, the focus detection is continued. A switch S5 denotes exposure mode setting switch for producing 2 bit signal which is transmitted to the microcomputer 21. The content of the 2 bit signal changes depending on the set mode. The camera of the present embodiment has four kinds of exposure control mode such as a program mode (referred to as P mode hereinafter), a diaphragm priority mode (referred to as A mode hereinafter), a shutter speed priority mode (referred to as S mode hereinafter), and a manual mode (referred to as M mode hereinafter).

A switch S6 switches the modes between a release priority mode in which the shutter release is given priority regardless of focus condition and a focus priority mode (referred to as AF priority mode hereinafter) in which the shutter release is permitted or inhibited depending on the focus condition. A switch S7 is an end terminal detection switch for detecting any one of the states that under the photographic lens is driven during the focus detection the photographic is moved to a nearest focusing position, or a farthest focusing position or the infinite distance focusing position. Upon turning on the switch S7 the microcomputer 21 executes the end terminal processing routine as described below. A switch S8 switches the continuous advance mode and the one frame advance mode, and a switch S9 is turned on at the completion of the exposure and is turned off at the completion of the one frame winding of a film.

In the circuit arrangement shown in FIG. 5, when the power source battery E is installed in the camera, the power is applied to the reset resistor $R_R$ and the condenser $C_R$ and a signal ranged from Low level to High level is input to a reset terminal RE of the microcomputer 21, which executes the reset routine (RESET) shown in FIG. 6. First, the microcomputer 21 resets and initializes flags and output ports in the steps #5 and #10. Next, the auxiliary light emitting device 33 is turned off, eliminating the display and the driving of the photographic lens is stopped and in case the photographic film has not yet been wound by one frame long, the motor for winding the photographic film is driven so as to fully wind up the photographic film by one frame long and the transistor Tr1 for applying power source is turned off when the winding of the film is completed in the steps #15 to #30. An auxiliary light flag for memorizing the emission of the auxiliary light is reset and the terminal OP3 of the microcomputer 21 is changed to Low level and the microcomputer 21 is stopped in the steps #35 and #40. The steps #15 to #40 mentioned above are enabled when coming back from the step #55.

When the release button is depressed to the first stroke after the power source battery E is installed in the camera, the switch S1 is turned on and the microcomputer 21 executes the program from AFS shown in FIG. 6. The microcomputer 21 resets all the flags and turns the transistor Tr1 on for applying the power source, whereby the power source is applied to each of the circuits and at the same time the light measurement circuit 23 starts the light measurement. The microcomputer 21 judges whether the switch S1 is on or off. In case of off of the switch S1, the program goes to the step #15 to perform the processes as mentioned above. In case of on of the switch S1, the next focus detection routine and a further routine following to the focus routine are executed from the step #55. When the switch S1 is on, it is judged whether the auxiliary light flag is set or not, and in case the flag is set, the auxiliary light emitting device 33 is enabled as the auxiliary light mode is set, whereby emitting the auxiliary light in the step #65 and the program goes to the step #70. In case the auxiliary light flag is not set, the program skips the step #65 and goes to the step #70.

The microcomputer 21 reads the time T1 during which lapsed from the starting of the last integration to the starting of the present integration by a timer TI and then the timer TI is reset to cause it to be started in the step #75 and the integration is started in the steps #70 to #78. Then in order to detect the relative position of the photographic lens, the microcomputer 21 reads a value CT1 of a counter (referred to as event counter hereinafter) representing the quantity to be moved to the in-focus condition in the step #80. Subsequently it is judged in the step #85 whether the flag for representing a mode which needs a long time for the integration is set or not and in case the long integration flag is set, the program waits for 80 m seconds in the steps #88 and #90 and if the integration is not finished in 80 m seconds, the auxiliary light emitting device 33 is turned off and the program goes to the step #110 through the steps #85 to #95. In case the long integration flag is not set, whether the integration is completed or not, after 20 m seconds passes, the program goes to the step #110 through #105. The integration is completed when the quantity of the incident light into a light receiving element of a monitor for controlling the integration period mounted near the CCD 29 becomes more than a predetermined value, but it has no direct relation with the present invention, the explanation thereof is herein omitted.

In the step #110, the value of the event counter is read as CT2 in order to know the relative position of the photographic lens at the time when the integration is ended. The microcomputer 21 dumps the data of the CCD 29 and executes the calculation of the focus detection by using the data of the CCD (#120 and #125). It is assumed that the value MI showing the relative position of the photographic lens in the center of the last integration is MIL and in order to know the relative position of the photographic lens in the center of the present integration, the sum of the relative position CT1 of the lens at the beginning of the integration and the relative position CT2 of the lens at the end of the integration divided by 2, the value of which is assumed M1 (#130, #135). Next, the amount of the lens movement from the center point of the last integration to the center point of the present integration is calculated but it can not be obtained by the mere subtraction MIL−MI.

Figure 7:
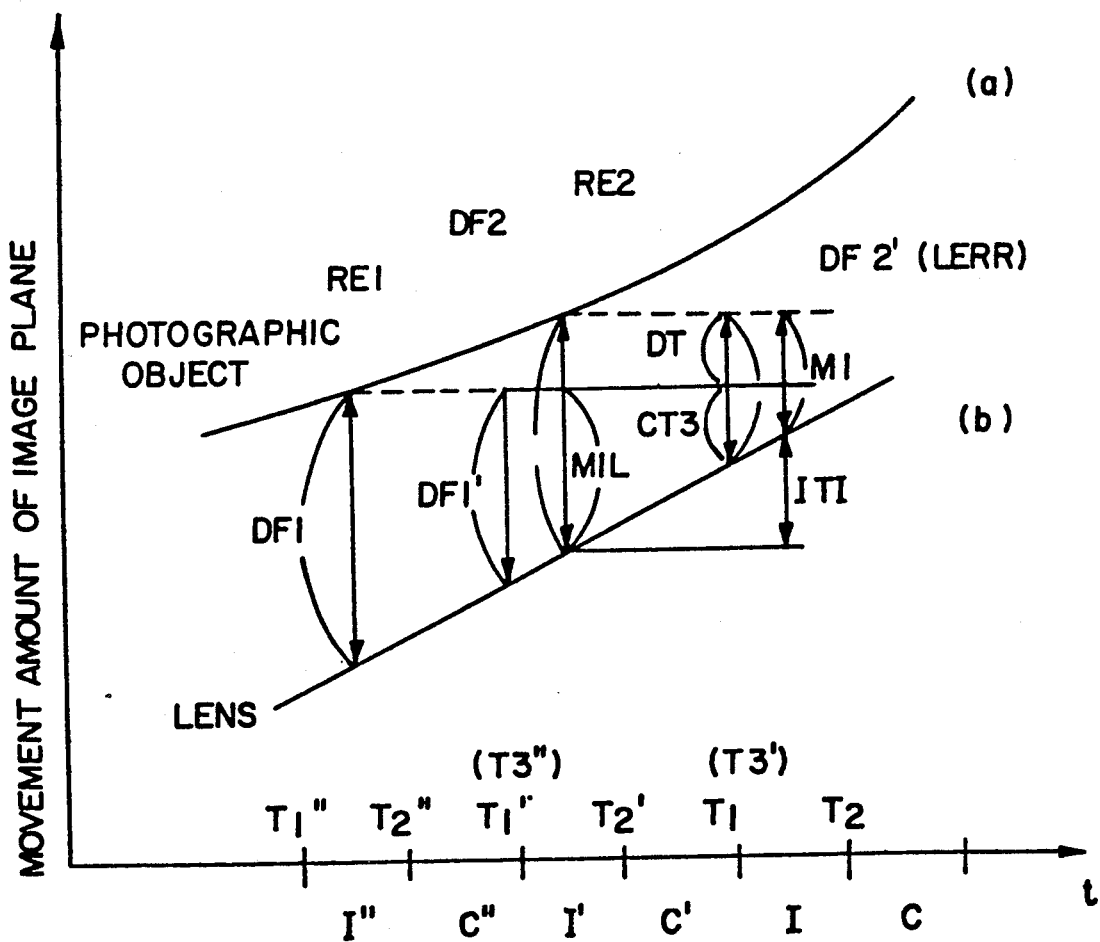
FIG. 7 is a graph showing an off-set of an event counter of the focus detection device.

The reason is explained with reference to FIG. 7. In this graph the horizontal axis shows the time and the vertical axis shows the amounts of the movement of the object on the film plane (see the curve a) and of the movement of the photographic lens (see the curve b). In FIG. 7 the integration and calculation are done in terms of the movement of the photographic lens. T1, T1' and T1" show the starting time of the integration, and T2, T2' and T2" show the ending time of the integration, and T3', T3" show the ending time of the calculation, wherein T1'−T3 and T1−T3'. This is because the time necessary for the focus detection is almost spent in the above mentioned integration, data dump and calculation of the focus detection in the steps #60 to #125. As the value MIL showing the relative position of the photographic lens at the time of the center point of the last integration I', there is used the resultant value of a division by 2 of sum of a first event counter value representing a first lens position at the time T1' of the starting period of the integration and a second event counter value T2 representing a second lens position at the time of the integration completion. The defocus amount from the object position RE1 is converted into the number of pulses generated by the encoder which is applied into the event counter at the time T1' of the end of the calculation C" as the result of the calculation C". The object position RE1 shows the defocus amount from the focal plane at the center time period of the integration I".

In the same way mentioned above, the defocus amount from the position RE2 of the object is converted into the amount in terms of the number of pulses of the encoder and the converted amount is inputted as the lens relative position MI at the center time period of the present integration I. Hence, two different scales, one has an origin of the result of the last integration and the other has that of the present integration, are included in the lens relative positions MIL and MI. Therefore, the value of MI1−MI does not show the correct amount of the movement of the photographic lens. Unless these two scales are coincided, the correct value of the movement of the lens can not be obtained.

It is assumed that the compensation amount is expressed DT. The compensation amount DT is obtained by finding the remainder between the value CT3 of the event counter from the photographic position RE1 showing the lens position at the end time T3 of the calculation C' and the converted value LERR of the number of the pulses of the encoder from the value DF2' of the calculation result at this time. The calculation is as follows.

$$DT = LERR - CT3$$

Figure 2:
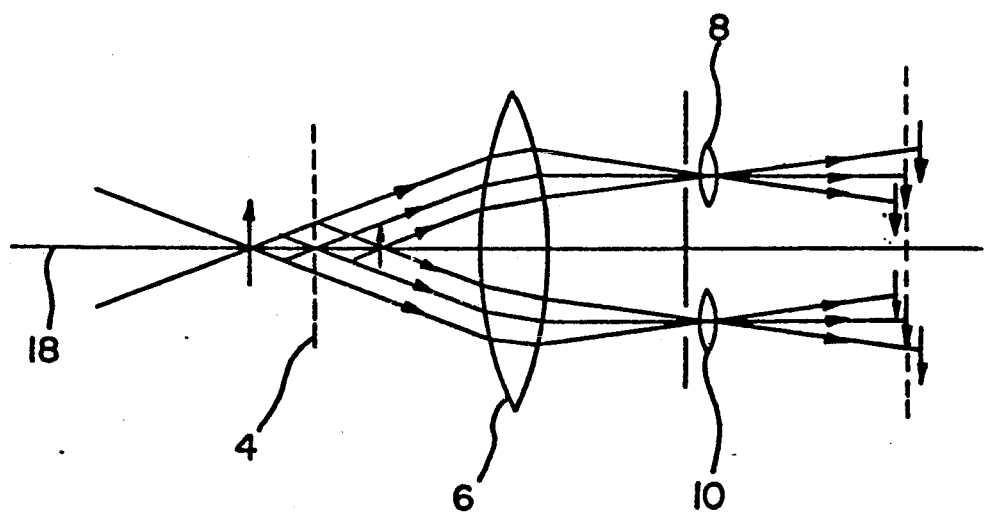

The amount ITI of the lens movement is obtained by the calculation that the above mentioned value DT is subtracted from the lens relative position MI at the center time period of the present integration and the substracted value is further substracted from the value MIL of the lens relative position. An equation of the above calculation can be expressed by IT1=MIL−(MI−DT). The microcomputer 21 executes the calculation mentioned above in the steps #140 and #145 in FIG. 2.

The microcomputer 21 reads out data from the ROM of the lens circuit 32 in order to apply the data of the opened aperture value AvO and the conversion factor (referred to as KL hereinafter) for converting the defocus amount into the pulse number of the encoder. First, a chip select terminal CS is made High level and a signal showing the starting of the communication of the data is generated and the variable N showing the number of the data read out from the ROM of the lens circuit 32 is set O and a serial communication order is enabled in the steps #155 and #160. In response to this serial communication order, a clock signal is generated from the terminal SCK of the microcomputer 21 and the data is generated from the lens circuit 32 in a bit by bit manner synchronized with the rasing of the clocks. Synchronizing the negative edge of the clock signal, the microcomputer 21 reads the data through the terminal SIN and one time of the serial communication is completed by generating eight pulses and the two kinds of the data mentioned above are applied from the lens circuit 32 at the two times of the completion of the serial communication in the steps #165 and #170. When the application of the two kinds of the data is completed, the terminal CS of the microcomputer 21 is changed to Low level from High level and the completion of the serial communication is transferred to the lens circuit 32 in the step #175, then the program goes to the subroutine of the exposure calculation in the step #180.

Figure 8:
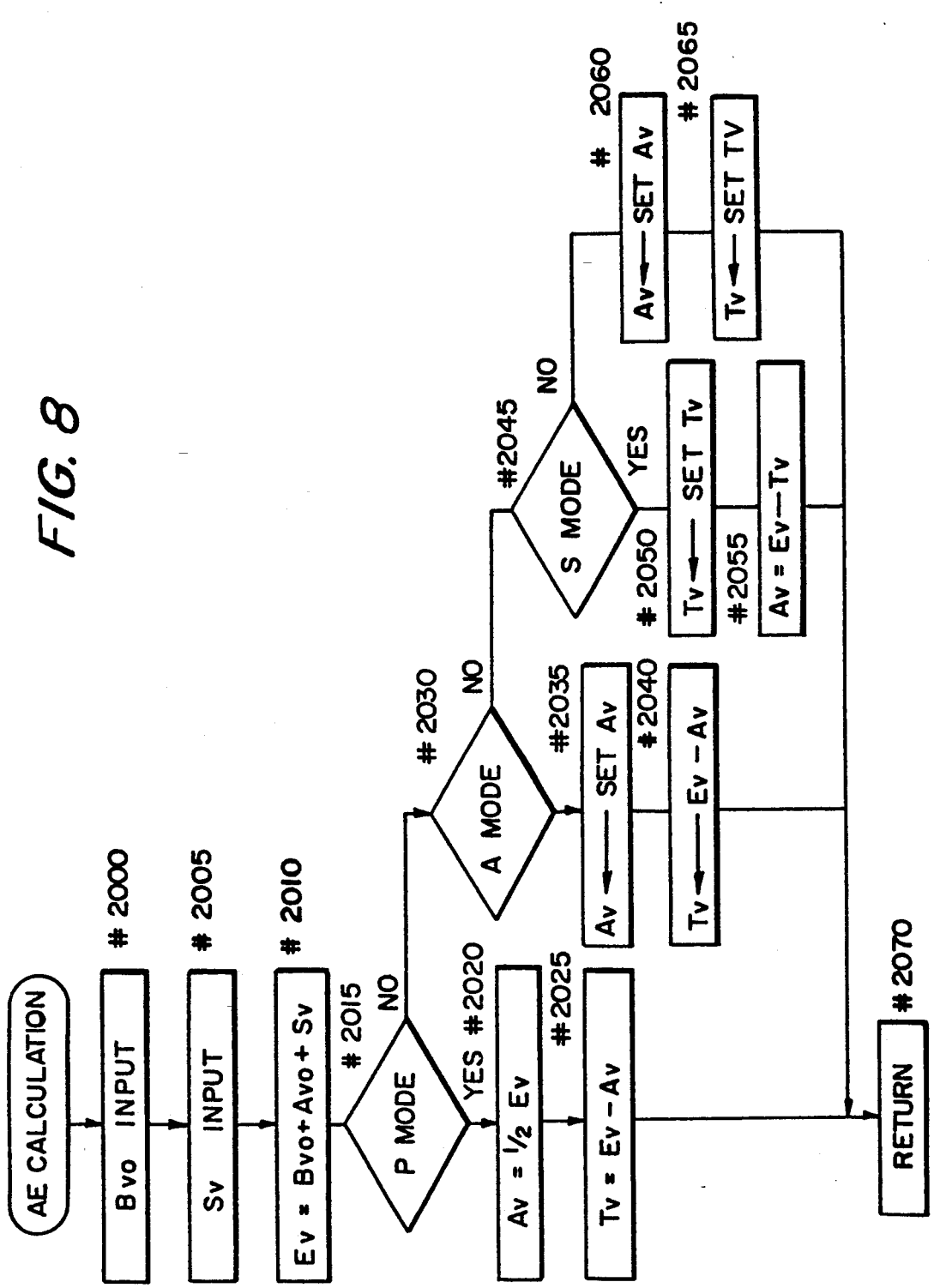

The subroutine of the exposure calculation is explained with reference to FIG. 8. The microcomputer 21 is supplied with a light measurement value BvO under the opened aperture value from the light measurement circuit 23 and is applied with the film sensitivity data Sv from the film sensitivity automatic reading circuit 24 in the steps #2000, #2005. The exposure value Ev is calculated in the step #2010 using the light measurement value BvO, the film sensitivity data Sv and the opened aperture value AvO as applied mentioned above. Next, the exposure control mode is judged, and in case of P mode the aperture value Av is obtained by making the exposure value Ev ½ and the shutter speed value Tv is calculated by subtracting the obtained aperture value Av from the exposure value Ev in the steps #2015 to #2025, then the program returns. In case of A mode, the set aperture value Av is read and the shutter speed value Tv is calculated by subtracting the set aperture value Av from the exposure value Ev in the steps #2030 to #2040, then the program returns. In case of S mode, the set shutter speed value Tv is read and the aperture value Av is calculated by subtracting the set shutter speed value Tv from the exposure value Ev and then the program returns in the steps #2045 to #2055. In case neither P nor S mode are not set, that is in case of M mode, the set aperture value Av and the shutter speed value Tv are read in the steps #2060 and 2065 and then the program returns.

The program goes back to the flow chart shown in FIG. 6 and when the exposure calculation is completed, it is detected from the result of the focus detection and calculation whether the focus detection is possible or not, and in case of the impossible detection the program goes to a LOWCON routine. In case the focus detection is possible, a low contrast flag LCF showing the focus detection to be impossible is reset and it is judged whether the object is in low light condition (that is the brightness of the object is lower than the predetermined value) in the steps #185 to #195. Unless in low light condition the auxiliary light flag is reset in the step #200, and in case of low light condition the program skips the step #200 and goes to the step #205 and the lens relative position at the end of the calculation is read by the event counter. The pulse number of the encoder is calculated by multiplying the conversion factor KL with the defocus amount Δε obtained by the calculation mentioned above. In case the pulse number of the encoder is positive, the variable TD showing the present direction of the lens shift is set 1 and in case the pulse number of the encoder is negative, the variable TD is set 0 in the steps #205 to #225.

Next, the program goes to the subroutine for precision check. In the focus control device used in the present embodiment, there are provided a precision priority mode in which the focus precision is given priority rather than the time for setting in-focus condition and the speed priority mode in which setting of the photographic lens in the in-focus condition is made fast rather than the focus precision in the focus control. The speed of the lens control motor M with refernce to the focus control device is described below. In the precision check subroutine, the above mentioned two modes are switched depending on the kind of the photographic lens attached to the camera and various conditions at the time of photographing. There can be considered various kinds of aspect as a precision check mode.

Figure 9C:
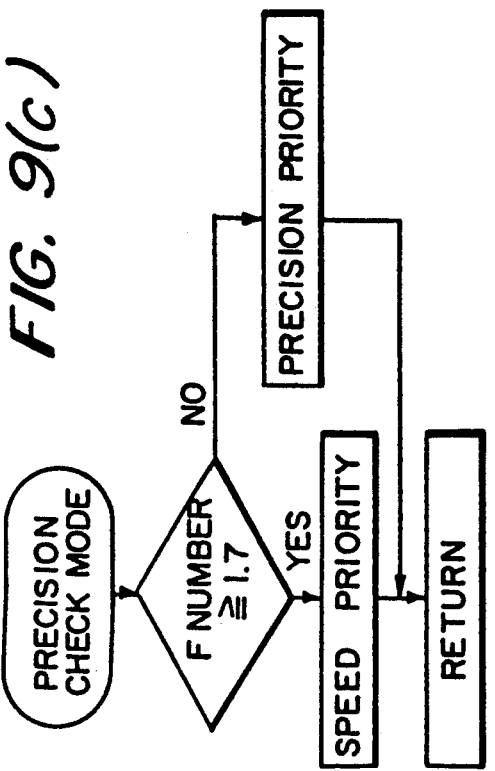
Figure 9D:
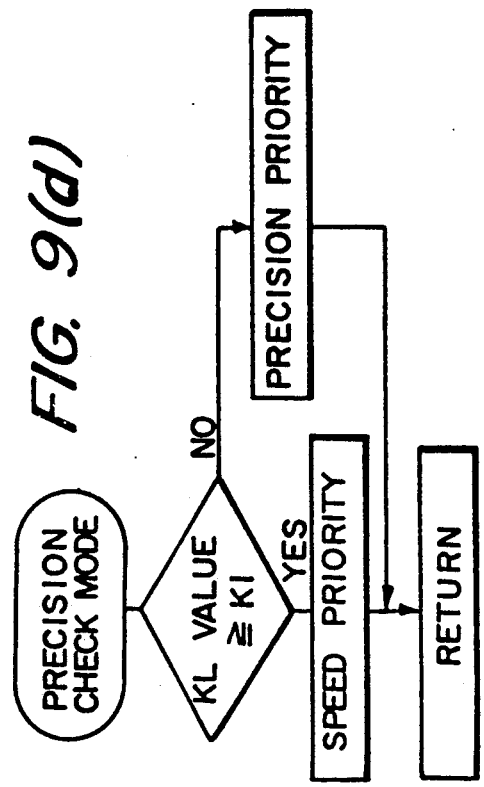
Figure 9A:
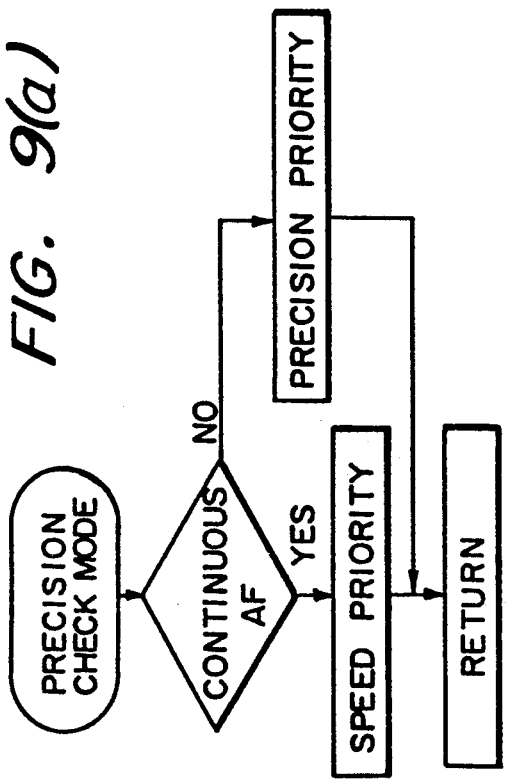
Figure 9B:
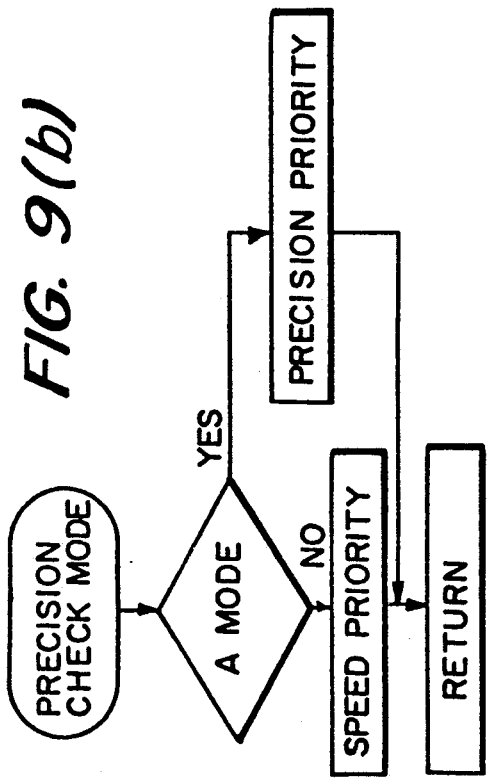

For example, as shown in FIG. 9(a), in case of the continuous advance mode, the speed priority mode is set because there are many cases of the focus control for a moving object, and in case of the one shot mode, the precision priority mode is set because there are many cases of the focus control for a static object. As shown in FIG. 9(b), in case of A mode the precision priority mode is set because there are many cases of a correct focus control for a static object such as a portrait, and in cases of the exposure control modes except the A mode, the speed priority mode is set. As shown in FIG. 9(c), in case the aperture value (F number) to be controlled is smaller than 1.7, the precision priority mode is set because there are many cases of using a portrait as an object, in case the F number is larger than 1.7, the speed priority mode is set because the depth of field of a lens becomes deep more or less. Any mode can be selected in case the minimum F number is nearly from F4 to F5,6. As shown in FIG. 9(d), when the conversion factor KL for converting the defocus amount into the encoder pulse number is large, that is in case the converting value of the defocus amount of the photographic lens per a pulse number is small, the speed priority mode is selected because it takes a long time for the focus control, and when the conversion factor KL is small, the precision priority mode is selected because the precise focus control can not be done if the speed of the lens movement is too fast. In this case since the photographic lens is set in the in-focus condition by a few pulse numbers in the precision priority mode, it takes a comparatively short time for focusing.

Figure 9E:
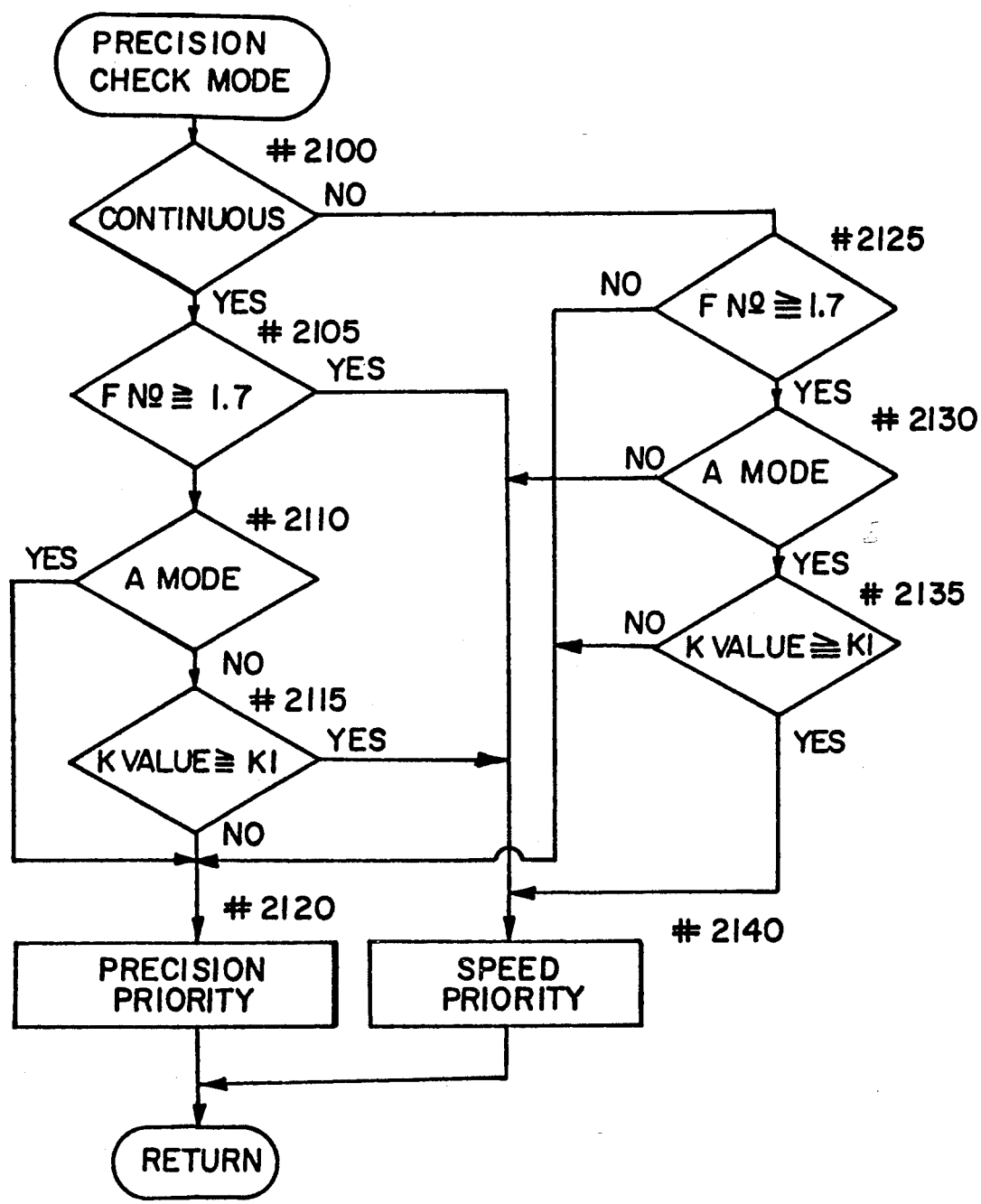

As shown in FIG. 9(e), the program including the four cases mentioned above is executed and the states of the judgement is shown in table 1. In this case, as to the selection of which modes of the precision priority mode and speed priority mode is to be used, such a mode that may be used more frequently is used. In case the frequency to be used is equal, the threshold of F number decides the priority. This is because in the lens of small F number the depth of field is so shallow that even a small amount of lens defocus causes defocused photographs to be increased.

Figure 6A:
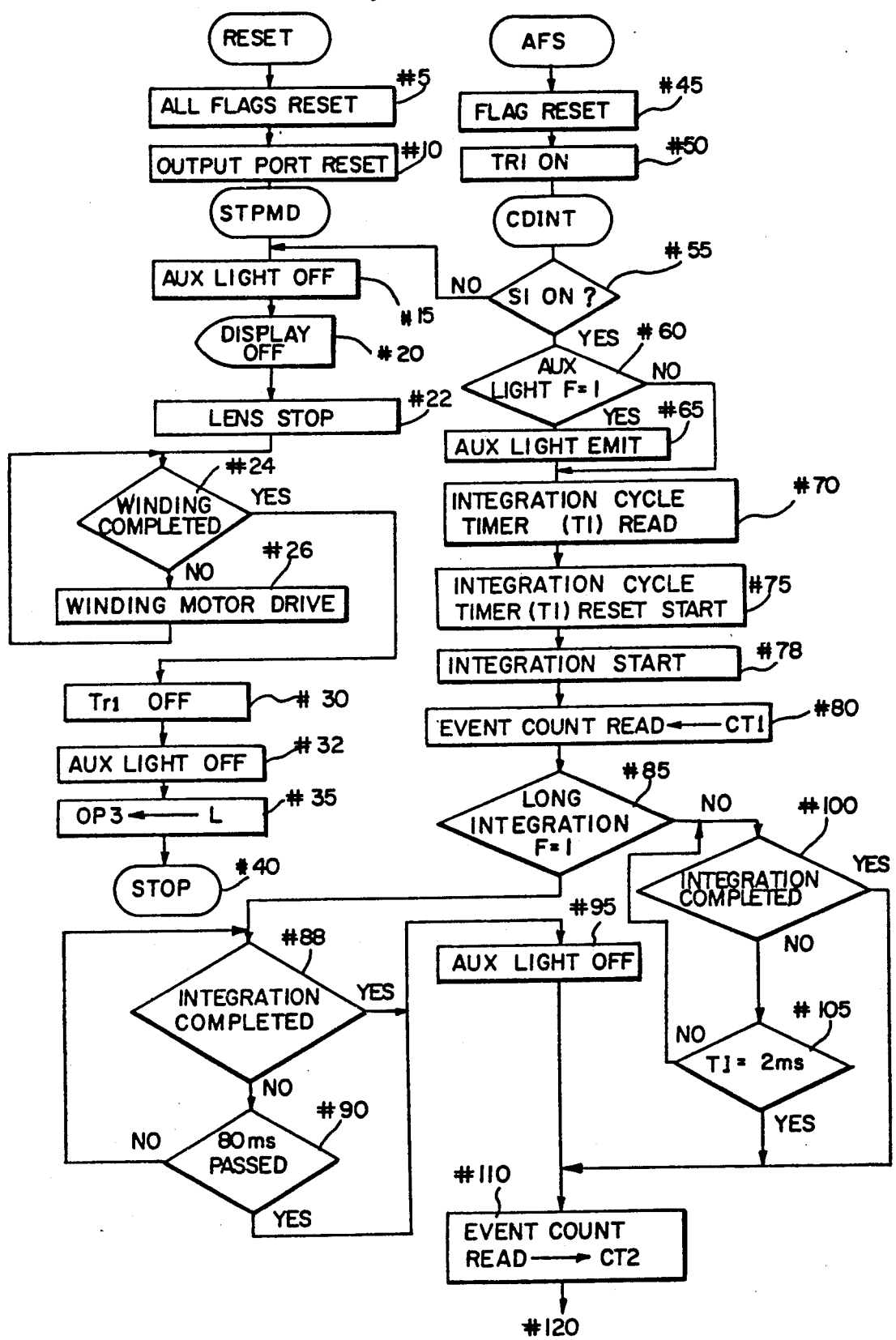
FIGS. 6(a) and 6(b) is a flow chart showing the action of the device shown in FIG. 5.
Figure 6B:
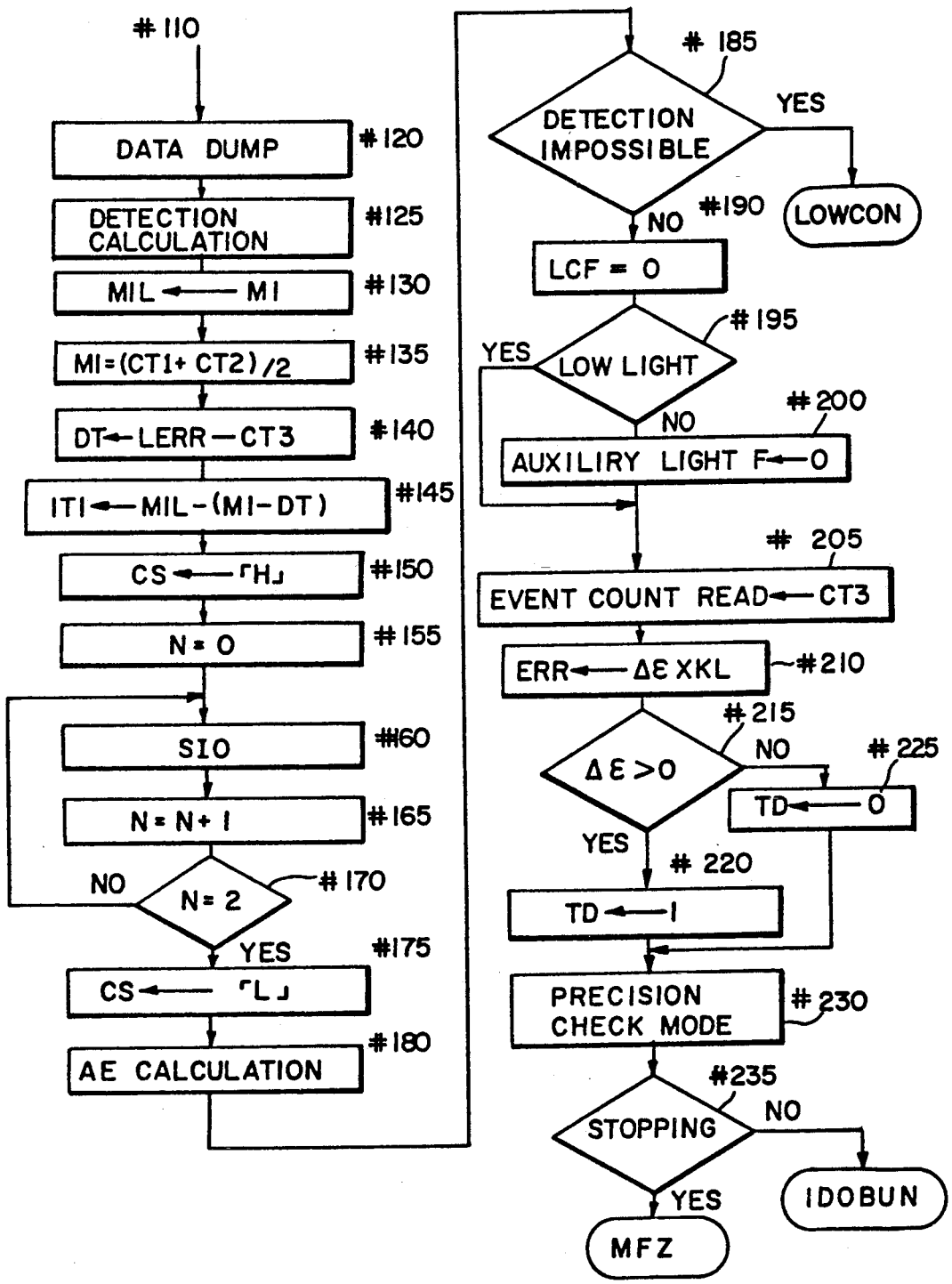

Going back to FIG. 6(b), after the completion of the precision check mode, it is detected in the step #235 whether or not the photographic lens is stopped by detecting the state of the motor driving signal. In case the photographic lens is in the stopped condition, the program goes to the MFZ routine, in case the photographic lens is moving, the program goes to the IDO-BUN routine.

The MFZ routine is explained with reference to FIGS. 10(a) and 10(b). Upon memorizing the defocus amount $\Delta\epsilon$ in the other variable $\Delta\epsilon_1$, and multiplying the focusing zone amount $\Delta IF$ (40$\mu$) by the conversion factor KL, the focusing zone pulse number IFP is calculated. Next, the encoder pulse number CTC showing the amount of the lens movement from the center time period of the integration to the end of the calculation is set to 0 in the steps #240 to #250. Next, it is judged whether or not the encoder pulse number ERR (referred to as defocus pulse number hereinafter) showing the defocus amount $\Delta\epsilon$ is smaller than 3 pulses. In case the defocus pulse number ERR is smaller than 3 pulses, the present defocus pulse number ERR is used as the last defocus pulse number LERR and the present defocus direction TD is adopted as the last defocus direction LD and the focusing display is executed by setting the in-focus flag in the steps #255 to #275. Then the flag AFEF showing the focus detection completion is set and it is judged from the condition of the switch S4 whether the mode is continuous mode or not. In case of the continuous mode, the program goes to the CDINT routine beginning from the step #55 shown in FIG. 6 and the focus detection is executed again. In case the one shot mode, the microcomputer 21 waits for the interruption and does not execute the focus detection.

In case it is detected in the step #255 that the defocus pulse number ERR is more than 3, it is judged in the step #290 whether or not the in-focus flag is set, and in case of setting the in-focus flag, it is judged in the step #295 whether the defocus pulse number ERR is within a predetermined in-focus zone pulse number. In case the defocus pulse number is within the predetermined in-focus pulse number, the program goes to the INFZ routine beginning from the step #260. In case it is detected in the step #290 that the in-focus flag is not set, regardless the present defocus direction TD and the last defocus direction LD are inverted, the program goes to the subroutine of the near zone A judgement as described below, wherein in case it is judged the defocus pulse number ERR is not within the near zone (NZF=1), an one time passage flag 1STF showing that the program has passed this routine one time is reset in the steps #370 to #380 and the program goes to the step #295.

Figure 27:
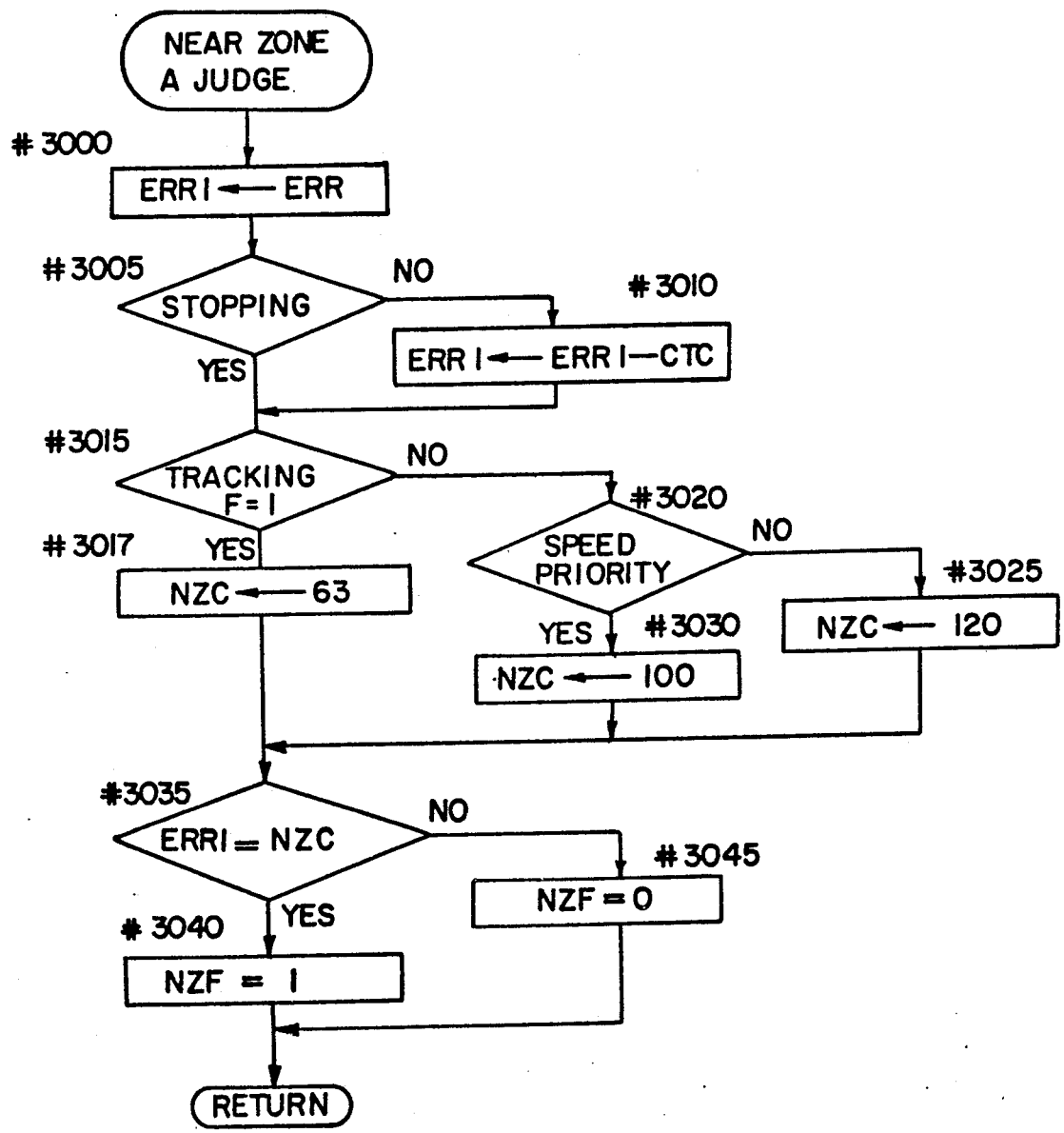

The subroutine of the near zone A judgement is explained with reference to FIG. 27. The microcomputer 21 sets the defocus pulse number ERR to be ERR1 and judges whether the lens is stopped or not in the steps #3000 and #3005. In case the lens is stopped, the program goes to the step #3015, and in case the lens is not stopped, upon subtracting the amount CTC of the lens movement from the defocus pulse number ERR1 in the step #3010, the program goes to the step #3015, in which it is judged whether a tracking flag showing the tracking mode is set or not. In case the tracking flag is set, a near zone counter NZC showing the near zone value is set to 63 in the step #3017. In case of non-tracking mode i.e., in case of the tracking flag is reset, the near zone counter NZC is set to 100 in the step #3030 when the speed priority mode is set. The near zone counter NZC is set to 120 in the step #3025 when the precision priority mode is set. Then the program goes to the step #3035. In the step #3035 it is judged whether or not the defocus pulse number ERR1 is smaller than the setting count value NZC of the near zone counter, in case of smaller than the count value NZC of the near zone counter, a near zone flag NZF is set in the step #3040 and in case of larger than the count value NZC of the near zone counter, the near zone flag NZF is reset in the step #3045 and the program returns.

In the present embodiment the range of the near zone may be changed depending whether the speed priority mode or the precision mode is selected, however, in this case since the count value NZC of the near zone counter has no relation with the speed control of the motor M, the count value NZC may be constant such as 100.

Figure 10A:
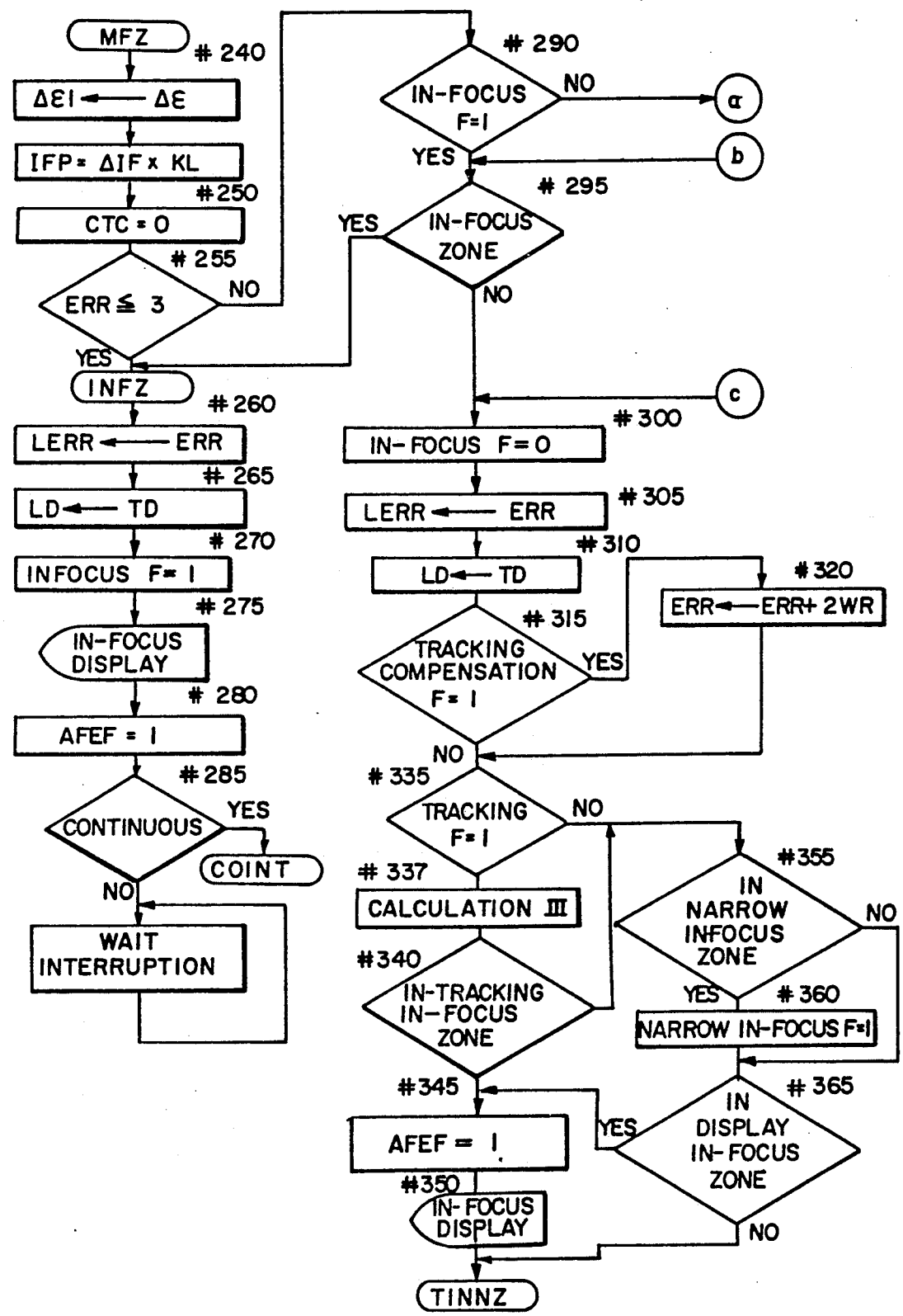
Figure 10B:
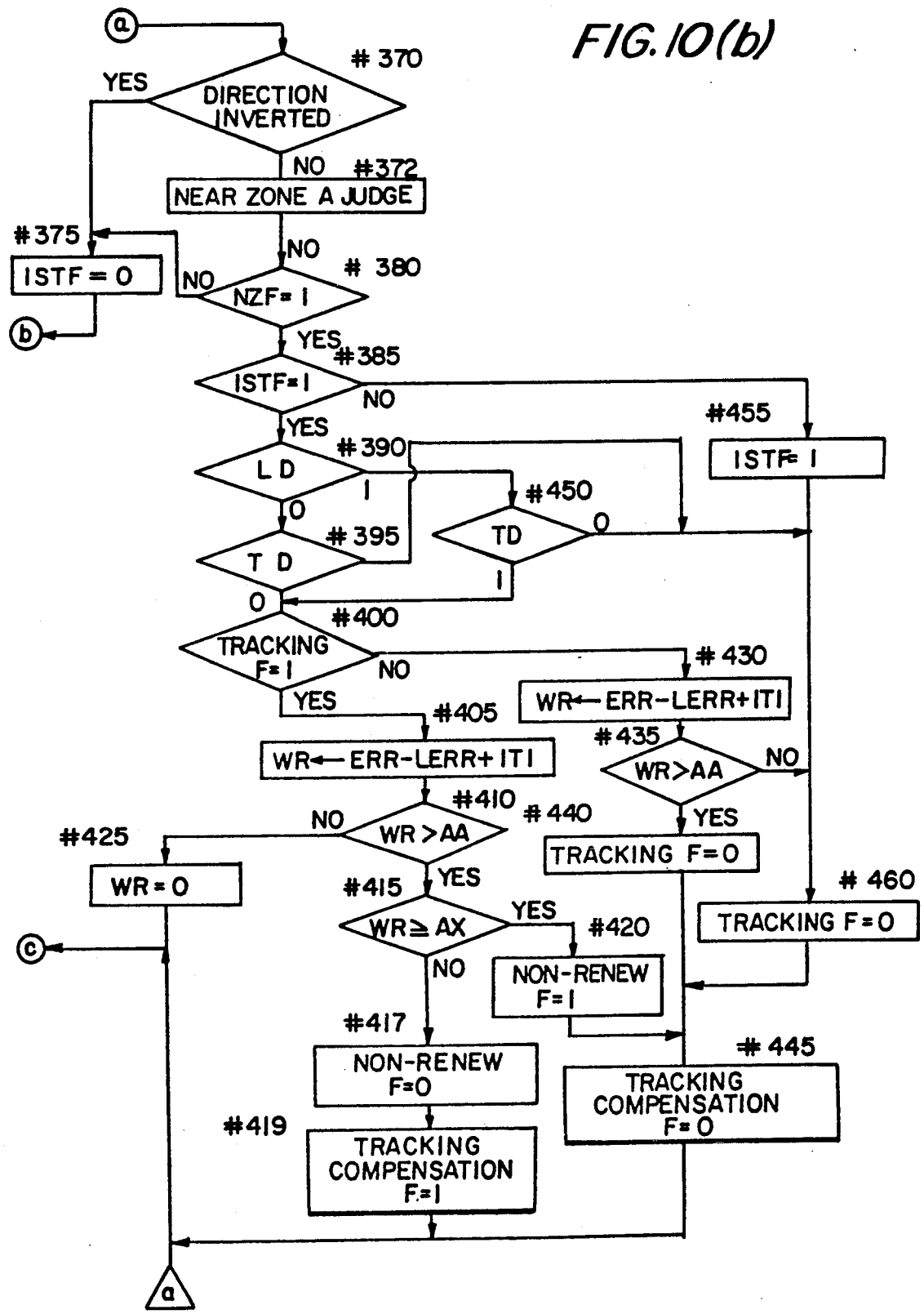

Going back to FIG. 10(b), in case it is detected in the step #380 that the near zone flag NZF is set, when the defocus amount increases against the moving object, the program after the step #380 shows for revising this defocus amount and it is referred to as the tracking mode. In the step #385 it is judged whether the one time passage flag 1STF is set. In case the one time passage flag 1STF is not set, the flag 1STF is set in the step #465 and the tracking flag showing the tracking mode is reset in the step #460 and the tracking compensation flag showing revising of the lens tracking is reset in the step #445, then the program goes to the step #300. In the step #385, in case the one time passage flag 1ST is set, it is judged in the steps #390 and #395 whether or not the last defocus direction LD is different from the present defocus direction TD. In case the defocus direction is different, that is, in case both of the direction data are respectively (1, 0) or (0, 1), the program goes to the step #460 and the tracking compensation at the time of the tracking mode is not executed. In case the last defocus direction LD is equal to the present defocus TD, that is, in case both of the direction data are (0, 0) or (1, 1), the program goes to the step #400 and it is judged whether the tracking flag is set or not (#390 to #395 and #400). In the step #400, in case the tracking flag is not set, the defocus amount WR is obtained in the step #430 by the calculation as follow, $$WR = ERR - LERR + ITI$$

wherein WR is inclined value, ERR is present defocus pulse number, LERR is last defocus pulse number, ITI is lens movement amount. In case it is detected in the step #435 that the inclined value WR is larger than a predetermined value AA that is, the defocus amount (defocus pulse number) is increasing, the tracking flag is set in the step #440, but in the present embodiment since the inclined value WR is revised when the value WR becomes positive two times, the tracking compensation flag is reset in the step #445 so as not to be revised in the first time. The predetermined value AA is decided considering a noise component and may be set 0 for the noiseless arrangement. In case the value WR is smaller than the predetermined value AA, the defocus amount is not larger and is not revised, then the program goes to the step #460.

In the step #400 in case the tracking flag is set, the value WR is obtained in the same way as in the step #430, and it is judged in the step #410 whether or not the value WR is larger than the predetermined value AA, in case the value WR is smaller than the value AA, the compensation is not necessary since the photographic lens can track the movement of the object, therefore, the compensation value WR is made 0 in the step #425 and the program goes to the step #300.

In case that it is judged in the step #410 that the value WR is larger than the value AA, the program goes to the step #415, wherein it is judged whether or not the value WR of difference from the last and the present calculation results is larger than the setting value AX which is set larger than the count value NZC of the near zone counter. The reason why the value AX is set is that in the tracking mode, that is, when the object is moving, the object is apt to get out of an area set for the focus detection because of the movement of the object, and if the object gets out of the area, the photographic lens is focused to the other object in the set area, therefore the value AX is set in order to prevent the above mentioned missing of the focusing. Therefore, in case the compensation value WR is larger than the setting value AX, the amount of the lens movement is not renewed because the object of the target is getting out of the area set for the focus detection. In other words, in the step #415 in case the compensation value WR is larger than the setting value AX, a non-renew flag for inhibiting the renewal of the lens movement is set in the step #420 and the tracking compensation flag is reset in the step #445. On the other hand, the compensation value WR is less than the value AX, the non-renew flag is reset in the step #417 and the tracking compensation flag is set in the step #419 and the program goes to the step #300.

In the step #295 in case the defocus amount Δϵ1 is not within the focusing zone, the program goes to the step #300 and the in-focus flag showing the in-focus condition is reset. Then the present defocus pulse number ERR is used as the last defocus pulses number LERR in the step #305 and the present defocus direction TD is used as the last defocus direction LD in the step #310. And it is judged in the step #315 whether or not the tracking compensation flag is set, in case of set of the tracking compensation flag, the new defocus amount is obtained by adding the tracking compensation value 2WR to the defocus pulse number ERR in the step #320 and the program goes to the step #335.

In the step #335 in case the tracking flag is set, the program goes to a subroutine of the calculation III shown in FIG. 11. In the subroutine of the calculation III it is judged whether the mode presently set in the camera is the automatic focus priority mode or not, and in case of the automatic focus priority mode, the time lag Td is set to 150 msec., and in case of the release priority mode, the time lag Td is set to 100 msec. and the program goes to the step #2215. When the release button is depressed to the second stroke and the lens movement is not 0 (out-of-focus condition) under such a case that the shutter release is allowed, the value Td is the lens movement value which can be obtained as follows.

$$Td = \text{release time lag (50 msec.)} + TC(\text{constant time})$$

The release time lag is decided depending on the structure of the camera in use. The constant time TC is set 100 msec. for the AF priority mode and is set 50 msec. for the release priority mode.

The reason why the value TC is changed depending on the respective modes is that since the AF priority mode is selected when the precise focusing for the object is desired, it is desired the defocus amount is equal to 0 by moving the lens as much as possible, therefore the lens is moved with the constant time to be long. On the other hand, in the release priority mode since it is important that the shutter release can be done at the instant that the operator of the camera desires a photographing, the constant time TC is made short.

In the next step #2215 the integration cycle T1 is read and a rate R is obtained by dividing the value Td by the length of time T1 of a cycle and the value R is multiplied by the compensation value WR in order to obtain the movement amount WS on the predetermined focal plane of the object moving during the time Td (#2215, #2220). The defocus pulse number ERRT is newly obtained in the step #2225 by adding the defocus pulse number ERR to the movement value WS. It is judged in the step #2230 whether or not the AF priority mode is selected, in case of the AF priority mode it is judged in the step #2245 whether or not the defocus pulse number ERRT is less than 148, and in case of the release priority mode it is judged in the step #2235 whether the defocus pulse number ERRT is less than 100. In case the defocus pulse number ERRT is less than the set values 148 or 100, a tracking in-focus flag showing the infocus condition in the tracking mode is set in the step #2240 and in case the defocus pulse number ERRT is more than the set values 148 or 100, the tracking in-focus flag is reset in the step #2250 and the program returns. The set value mentioned above is explained in the release mode as described below.

Going back to the step #340 in FIG. 10(a) it is judged from the condition of the tracking in-focus flag whether or not the defocus amount is within the tracking in-focus zone, in case it is within the tracking in-focus zone, a flag AFEF showing the completion of the focus detection is set in the step #345 and the in-focus display is effected and the program goes to the TINNZ routine in the steps #335 to #350. In case it is judged in the step #335 the tracking flag is not set, or in case it is detected that the defocus amount is not within the tracking in-focus zone in the step #340, the program goes to the step #355 and it is judged whether or not the defocus pulse number ERRT is within the narrow in-focus zone as described below. In case the defocus pulse number ERRT is within the narrow in-focus zone, a narrow in-focus zone flag is set in the step #360 and the program goes to the step #365. In case it is detected in the step #355 that the defocus pulse number ERRT is not within the narrow in-focus zone, the program skips the step #360 and goes to the step #365. In the step #365 it is judged whether or not the defocus pulse number ERRT is within the display in-focus zone as described below, in case of within the display in-focus zone the flag AFEF showing the completion of the focus detection is set and the infocus display is done, and in case the defocus pulse number ERRT is not within the display in-focus zone, the in-focus display is not done and the program goes to the flow TINNZ. The in-focus zone is explained as follows.

(1) In-focus zone (#295)

The area used in the conventional device and once the amount of the lens movement necessary for the in-focus condition becomes 0 and in case the result of the integration is within the area under the condition of stopping of the photographic lens, the in-focus display is done.

(2) Display in-focus zone (#365)

This zone is wider than the in-focus zone shown in the item (1) and in this zone the photographic lens can be precisely moved to the in-focus zone during the release time lag after starting of the shutter release operation. In the present embodiment, the display in-focus zone is the defocus amount corresponding to the pulse number 21, the defocus amount depending on the property of the photographic lens attached to the camera. In spite of the lens movement or stopping when the defocus amount becomes within the zone, the in-focus display is done and the shutter release is permitted in the AF priority mode.

(3) Tracking in-focus zone (#340)

This is the widest zone of all and shows the zone of the in-focus display in the tracking mode and of permitting of the shutter release in the AF priority mode. The photographic lens may not be reached to its in-focus condition (the defocus amount is 0) when the photographic lens tracks the movement of the object in the tracking mode. However, in the AF priority mode of the prior art the shutter cannot be released unless the photographic lens is stopped. The tracking in-focus zone is provided in order to prevent the above mentioned problem, and the value of the tracking in-focus zone corresponds to the amount of the release time lag and the movable value of the lens during the constant period. The value mentioned above is explained with reference to the flow of the release as described below.

(4) Narrow in-focus zone (#355)

This zone is almost similar to the in-focus zone of (1).

The reason why the narrow in-focus zone is provided is described as follows. During the movement of the photographic lens in this narrow in-focus zone, the amount CTC of the lens movement from the center point of the integration to the end of the calculation is subtracted from the defocus pulse number. Though the defocus pulse number is regarded as the value at the center point of the integration, it may not be the center point at the integration because of the change of the light, camera shaking and electrical noise. Therefore, even if the amount of the lens movement is subtracted from the defocus pulse number, the correct defocus amount may not ne obtained and even if the lens is moved as far as the defocus amount and stopped, the in-focus condition may not be obtained. In this case the lens must be moved again depending on the result of the next focus detection and in the lens movement if the similar event takes place, the lens must be moved corresponding to the further next result of the focus detection, therefore, the lens does not stop by detecting the in-focus condition for ever. The narrow in-focus zone is provided in order to eliminate the drawbacks mentioned above. For this purpose, when the defocus amount is within the narrow in-focus zone, the focus detection is not executed and the lens is moved until the defocus pulse number becomes 0.

Figure 12:
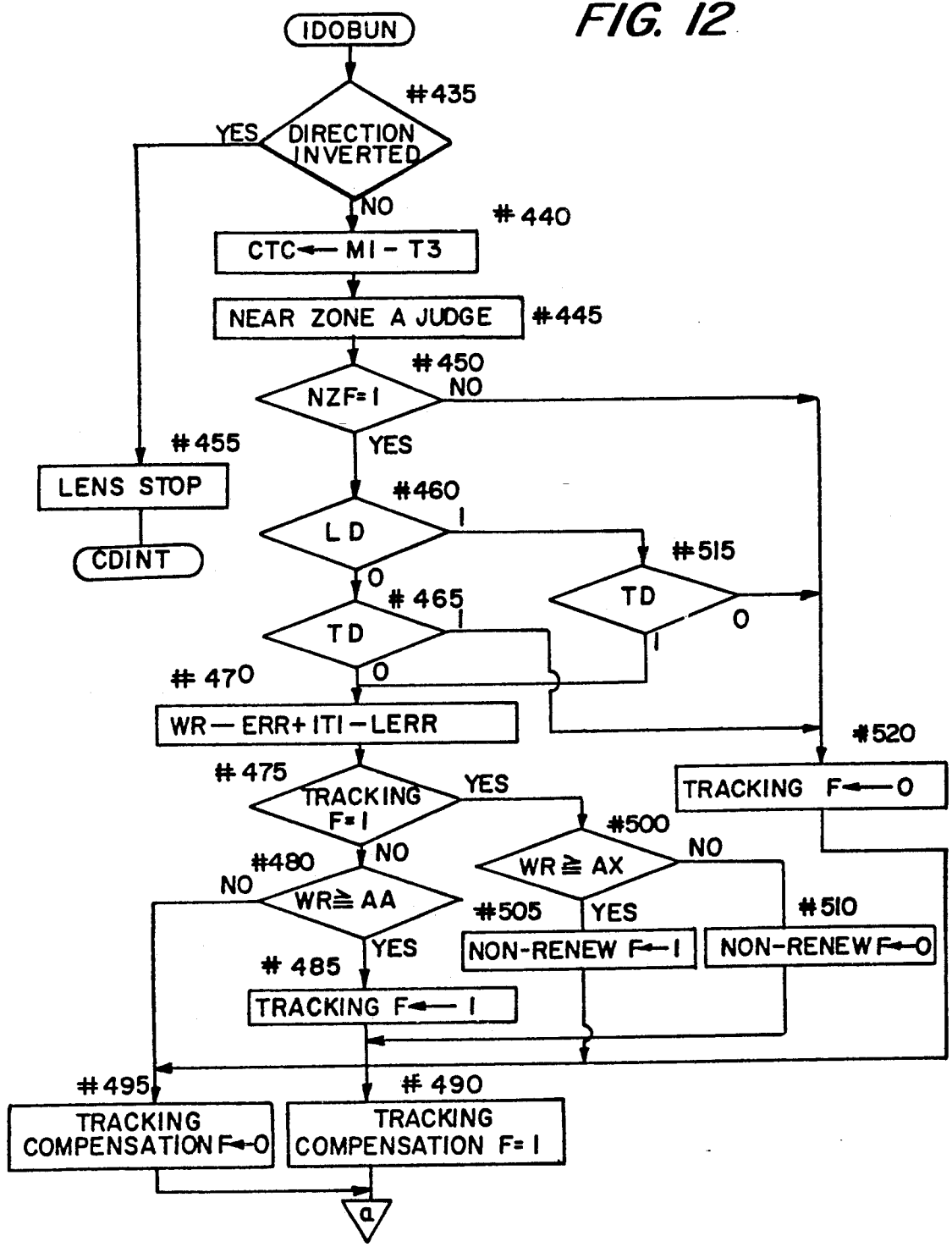

In FIG. 6(b), when the photographic lens is not stopped in the step #235, the program goes to the flow IDOBUN shown in FIG. 12

In the flow IDOBUN in FIG. 12 it is judged whether or not the present calculated defocus direction is different from the last calculated defocus direction in the step #430. In case the present defocus direction is inverted, the lens is stopped in the step #455 and the program goes back to the flow CDINT below the step #55 shown in FIG. 6(a) in order to execute the integration again. On the other hand, in case the direction of the lens movement is not inverted in the step #435 in FIG. 12 the movement amount CTC of the lens moving from the center point of the integration to the end of the calculation is calculated in the steps #435, #440. The program goes to the subroutine of near zone A judgement as described below, and in case it is detected in the step #445 that the near zone flag NZF is set as the result of the judgement in the subroutine, the program goes to the step #460, and in case it is detected in the step #450 that the near zone flag NZF is not set, the tracking flag is reset in the step #520. In the steps below #460 it is judged whether or not the last calculated defocus direction LD is equal to the present calculated defocus direction TD, in case the same direction, the program goes to the step #470 and the movement amount ITI of the lens moving during the period from the center point of the last integration to the center point of the present integration is added to the present defocus pulse number ERR and the value is subtracted by the last defocus amount LERR, whereby the compensation value WR is obtained through the steps #460 to #470, #515.

Figure 14A:
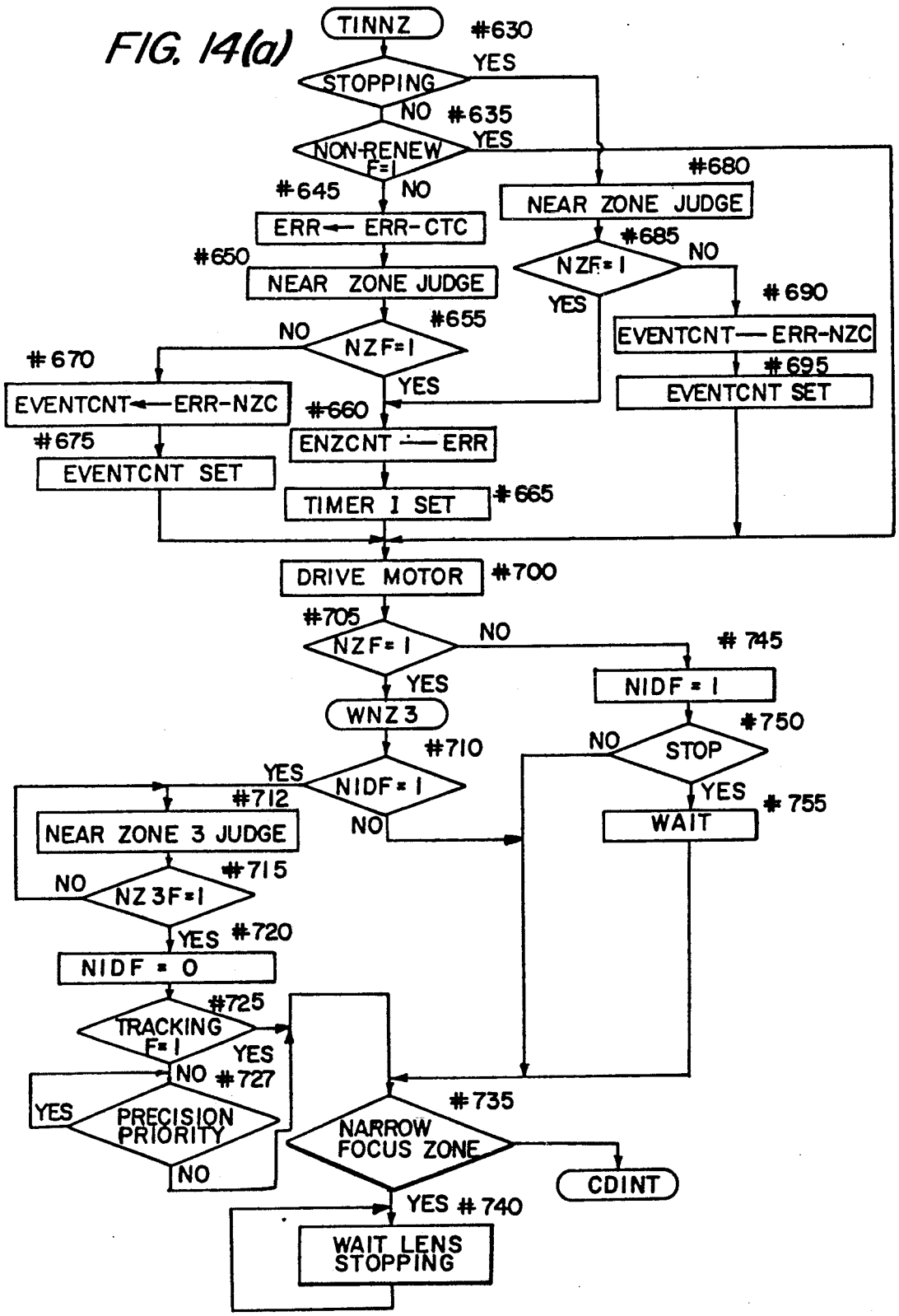
Figure 14B:
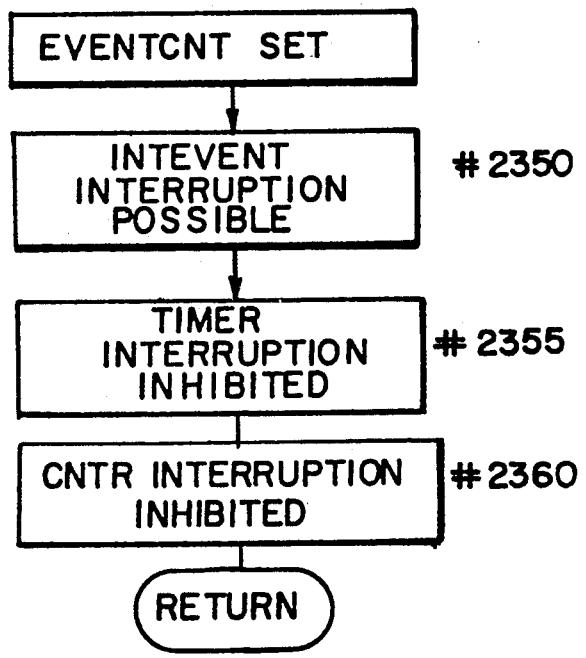

Next, it is judged in the step #475 whether the tracking flag is set or not, and in case it is detected that the tracking flag is not set in the step #475 and the compensation value WR is more than the predetermined value AA, in the step #480 the tracking flag and the tracking compensation flag are respectively set in the steps #485 and #490, and the program goes to the step #300 in FIG. 14.

On the other hand, it is detected in the step #480 that the compensation value WR is less than the predetermined value AA, the tracking compensation flag is reset in the step #495 and the program goes to the step #300. In case the tracking flag is set in the step #475, it is judged whether or not the compensation value WR is more than the predetermined value AX (larger than the count value NZC of the near zone counter), in case of more than the predetermined value AX, it is detected that the photographic object is out of from the focus detection area and the non-renew flag inhibiting the renew of the amount of the lens movement is set and the tracking compensation flag is reset and the program goes to the step #300 (#500, #505, #490).

In the step #500 in case the compensation value WR is less than the predetermined value AX, the non-renew flag is reset and the tracking compensation flag is set, and the program goes to the step #300 (#500, #510, #490).

Figure 13:
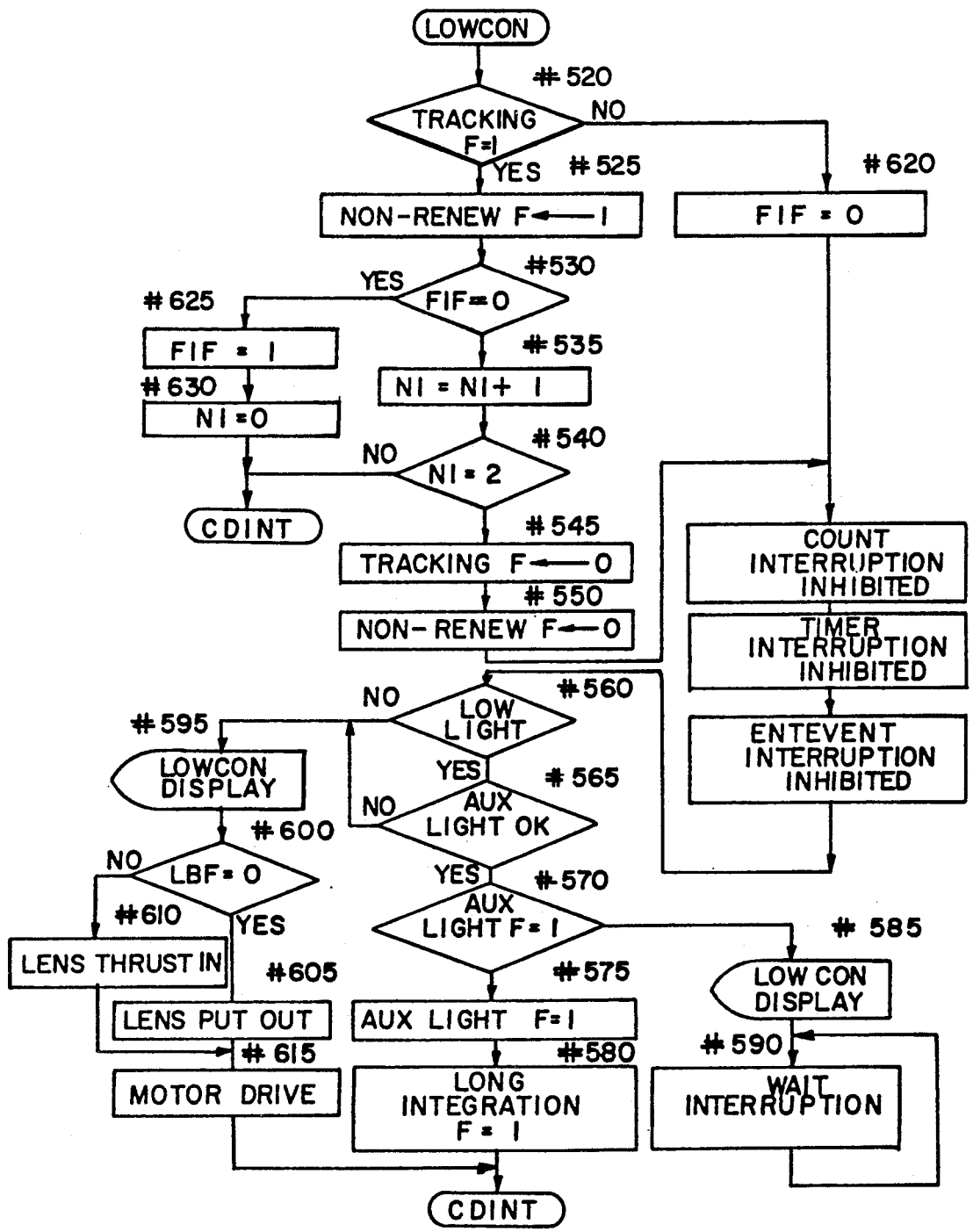

In FIG. 6(b) in case it is judged the focus detection is impossible in the step #185, the program goes to the flow LOWCON in FIG. 13. In the LOWCON flow in FIG. 13 the microcomputer 21 judges whether the tracking flag is set or not, in case the flag is set, the non-renew flag is set (#520, #525). Then the microcomputer 21 judges whether the flag FIF showing the one time passage is set or not, and in case the flag FIF is not set, that is, in case of the one passage the flag FIF is set and the variable N1 is set 0, and the program goes to the flow CDINT below the step #55 in FIG. 6(a) (#530, #625, #630).

In the step #530 in case the flag FIF is set, it is judged whether the valuable N1 is 2 or not by adding 1 to the variable N1, and in case the variable N1 is not 2, the program goes to the CDINT routine below the step #55 in FIG. 6(a), and in case the variable N1 is 2, the tracking flag and the non-renew flag are respectively reset and the program goes to the step #555 (#535 to #550).

In the steps #520 to #550, #625 and #630 since the defocus amount may be increased suddenly or it may be judged that the focus detection is impossible when the object is out of the focus detection area in the tracking mode, a countermeasure is devised for eliminating the problems mentioned above. It means that even if the defocus amount is suddenly increased, so far as the focus detection is possible, the compensation value WR can be suddenly increased and then the program can be performed in the steps #500 to #510 in FIG. 12. On the other hand, in case it is judged that the focus detection is impossible in the step #185 in FIG. 6(b) the program goes to the flow LOWCON in FIG. 13. In case it is judged the focus detection is impossible in the tracking mode, that is, in case the object is out of the focus detection area, the photographic lens is moved on the basis of the defocus amount calculated in the last calculation time without performing the usual focus detection process beginning from the step #555. On the other hand, in the step #520 in case the tracking flag is not set, the flag FIF is reset and the program goes to the step #555.

Below the step #555 the counter interruption, the timer interruption and the ENTEVENT interruption are inhibited (#555 to #557). It is judged from the output of the light receiving element disposed near the photo diode of CCD whether or not the reason of the judgement that the focus detection is impossible is caused due to an extreme low brightness of the object. In case the low brightness is the reason of the impossibility of the focus detection, it is judged whether or not the auxiliary emitting device 33 is mounted in the camera, and in case the auxiliary light emitting device 33 is mounted in the camera, the auxiliary light emitting mode is selected and it is judged whether a auxiliary light flag is set or not (#560 to #570). In case it is detected in the step #570 that the auxiliary light flag is set, that is, in case the focus detection is impossible because of the low brightness though the auxiliary light is once emitted, the LOWCON display showing the impossibility of the focus detection is executed and the microcomputer 21 waits for the interruption to stop the focus detection (#570, #585, #590). In case it is detected in the step #570 that the auxiliary light flag is not set, the auxiliary light flag is set and the long integration flag showing the mode of long integration period is set, and the program goes to the flow CDINT for the focus detection below the step #55 in FIG. 6(a). In case it is judged the brightness of the photographic object is not low in the step #560, or it is judged the auxiliary light emitting device 33 is not mounted in the camera in the step #565, the LOWCON display is executed (#595). It is judged whether a flag LBF showing that the photographic lens should be moved in a backward direction towards the focal plane is set or not, and in case the flag LBF is not set, an order for moving the photographic lens in the backward direction is produced. On the other hand, in case the flag LBF is set, an order for moving the photographic lens in the forward direction is produced. and the command signal for driving the lens driving motor M is generated, and the program goes to the flow CDINT for the focus detection below the step #55 in FIG. 6(a) and the focus detection is executed (#600, #605, #610, #615).

The flow of the control of the lens driving shown in FIGS. 14 to 17 is explained. First the speed control of the lens driving motor M in the embodiment is explained. The lens driving motor M has five kinds of the motor speed consisting of an outside the near zone (out zone) speed, three kinds of speed in the near zone and the step driving. The five kinds of speed control of the lens driving motor M is executed corresponding to the defocus pulse number in the precision priority mode and the speed priority mode respectively in the tracking mode or the non-tracking mode. These five kinds of speed control are shown in Table 2 as the revolution of the motor M such as 20,000 r.p.m. (out zone), 5,000 r.p.m. (near zone 1), 2,500 r.p.m. (near zone 2), 1,000 r.p.m. (near zone 3) and the step driving. The step driving is used only in the precision priority non-tracking mode and the control of the lens can be done precisely. The lens speed for the defocus pulse number in the near zone is selected corresponding to the necessary speed for the focus condition. The faster the revolution of the motor is, the worse is the stopping precision of the motor M apt to be. The speed control of the motor M in the sequence of the camera is explained as follows. First the flow TINNZ shown in FIG. 14 is explained. In the step #630 the microcomputer 21 judges whether or not the lens is stopped. In case the lens is not stopped, it is judged whether or not the non-renew flag showing the amount of the lens movement is not necessary to be renewed is set, and in the case the non-renew flag is set, the amount of the lens movement is not renewed and the program goes to the step #700 (#630, #635). In the step #630 in case the lens is stopped, the program goes to the step #680 and the subroutine for judging whether or not the lens is in the near zone.

The subroutine for the judgement of the near zone is shown in FIG. 15. In the step #2300 the microcomputer 21 judges whether or not the tracking flag is set, and in case the tracking flag is set, the count value NZC of the counter showing the area of the near zone is set to 63, and in case of the non-tracking mode in which the tracking flag is reset, the count value NZC of the near zone counter is set to 100 in case of the speed priority mode and is set to 120 in case of the precision priority mode, then the program goes to the step #2310 (#2300, #2305, #2325 to #2335). In the step #2310 it is judged whether or not the defocus pulse number ERR is less than the set count value NZC of the near zone counter, and in case the defocus pulse number ERR is less than the count value NZC of the near zone counter, the near zone flag NZF showing the near zone is set, and in case the defocus pulse number ERR is more than the count value NZC of the near zone counter, the near zone flag NZF is reset and the program returns (#2310 to #2320).

Then the program goes back to the step #685 in FIG. 14 and it is judged whether or not the near zone flag NZF is set, and in case the flag NZF is not set, the value of the defocus pulse number ERR substracted by the count value NZC of the near zone counter is applied to the event counter EVENTCNT (#685 to #690). The event counter EVENTCNT reduces 1 every time the pulse is sent from the encoder 31 shown in FIG. 5 and executes the interruption INTEVENT showing the entering near zone when the count value of the counter becomes 0. When the application of the pulses to the event counter EVENTCNT is completed, the program goes to the subroutine of the event counter set (EVENTCNT set) and when the subroutine of the EVENTCNT set is finished, the program goes to the step #700. The subroutine of EVENTCNT set is shown in FIG. 14 (b).

In the subroutine of the EVNETCNT set, the interruption INTEVENT by the event counter is permitted and the timer interruption as described below and the counter interruption (CNTR interruption) are inhibited, then the program returns (#2350 to #2360).

Figure 18:
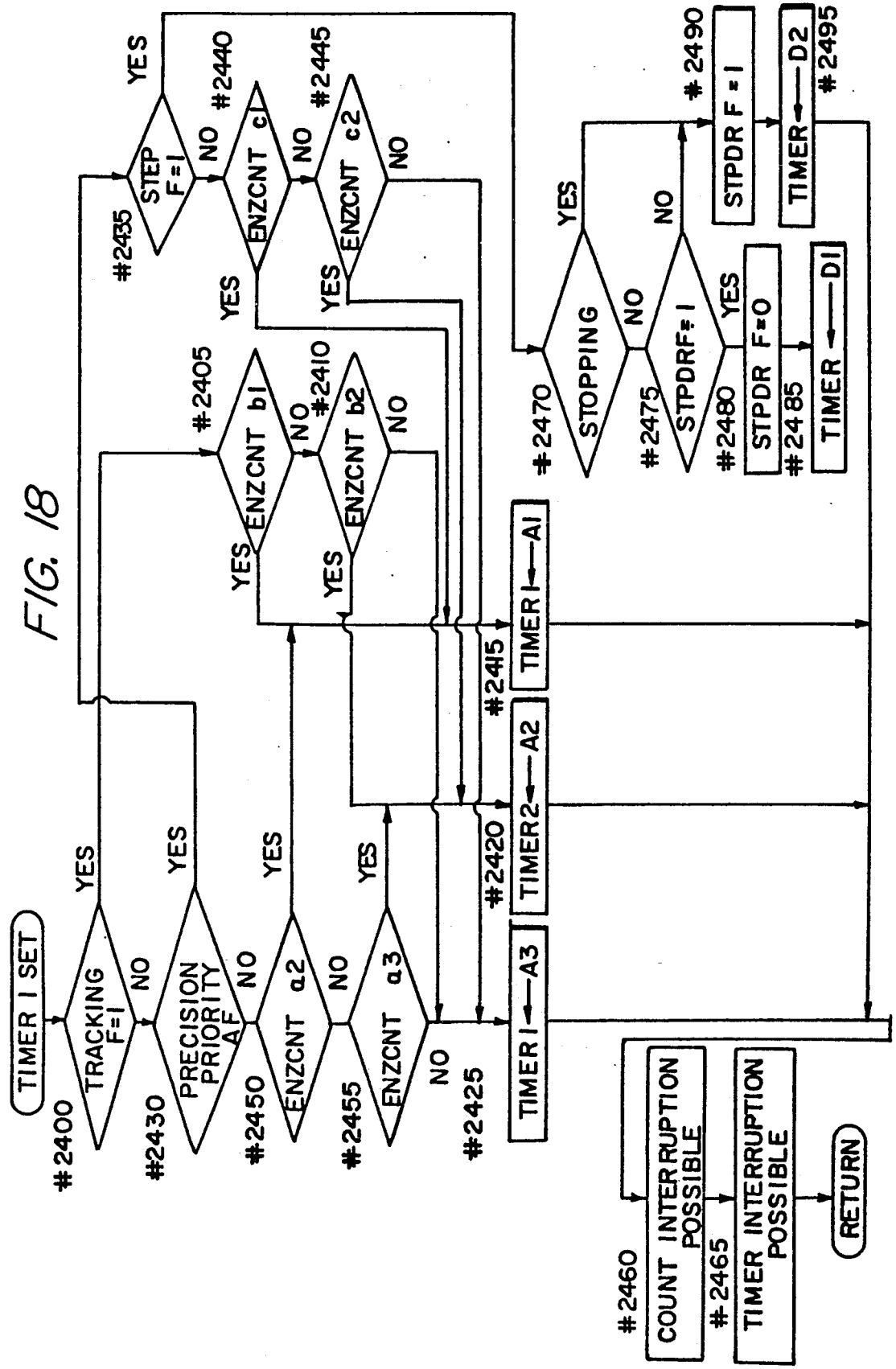

In case the non-renew flag is not set in the step #635 in FIG. 14(a) the defocus pulse number ERR is subtracted by the movement amount CTC of the lens moving from the center point of the integration to the end of the calculation and is used as the actual defocus pulse number necessary to drive the motor M and the program goes to the subroutine for the judgement of the near zone as shown in FIG. 15 (#645, #650). In the subroutine for the judgement of the near zone, in case the near zone flag NZF showing the near zone is not set, the defocus pulse number ERR is subtracted by the count value NZC of the near zone counter and the resultant value is used as the count value EVENTCNT of the event counter, then the program goes to the subroutine of the event counter (EVENTCNT) set and goes to the step #700 via the subroutine (#655, #670, #675). In case the near zone flag NZF is set in the step #655 or #685, the defocus pulse number ERR is applied to a driving counter ENZCNT in the step #660 and the program goes to the subroutine #665 of the timer I set the details of which is shown in FIG. 18 and after the completion of the subroutine, the program goes to the step #700.

In the subroutine of the timer I set, the speed of the motor M is decided corresponding to the defocus pulse number in the near zone with reference to each of the tracking mode, speed priority in the non-tracking mode and precision priority as shown in Table 2. In the present embodiment the rotational speed of the motor M is controlled by such a way that the motor M is switched on or off whether the pulse is sent from the encoder in the predetermined period to keep the constant speed of the motor and said predetermined period is changed. The shorter the predetermined period, the faster becomes the speed of the motor M, and the relation among the set time A1 of the timer corresponding to 5,000 r.p.m., the set time A2 corresponding to 2,500 r.p.m. and the set time A3 corresponding to 1,000 r.p.m. is $A1<A2<A3$.

The detailed description of the subroutine of the timer I set shown in the step #655 in FIG. 14 is explained with reference to FIG. 18. In the steps #2400 to #2455 the timer is set for the motor revolution as shown in Table 2, and in the steps #2460 and #2465 the count interruption and the timer interruption are respectively permitted and then the program returns, wherein a2=61, a3=30, b1=31, b2=15, c1=79, c2=31. In case the flag STEPF showing the step driving mode is set in the step #2435, the program goes to the step #2470. In the step #2470 it is judged whether or not the driving of the motor M is stopped, and in case the driving of the motor is not stopped, it is judged whether or not the step driving flag STDRF showing that the count interruption by the encoder pulse has been effected with the value of the driving counter for the step driving is set and in case the flag STPDRF is set, the flag STPDRF is reset and the timer is set D1 (#2470 to #2485). On the other hand, in case the motor M is stopped or the step driving flag STPDRF is not set, the flag STPDRF is set and the timer is set D2 (#2470, #2475, #2490, #2495). The relation between the two driving times D1 and D2 is $D1<D2$.

Going back to FIG. 14, the motor M is driven in the step #700. It is judged whether or not the near zone flag NZF is set and in case the flag NZF is not set, a moving integration flag NIDF showing that the integration is executed while the lens is moving is set (#705, #745). Next, it is judged in the step #750 whether or not the motor M is stopped and in case the motor M is stopped, the program goes to the step #735 after a short period of the starting time of the motor M in the step #755. In case the motor M is driven, the program goes to the step #735 immediately. In the step #735 it is judged whether or not the defocus pulse number ERR enters in a value corresponding to the narrow in-focus zone, and in case the defocus pulse number ERR corresponds to the value for reaching the narrow in-focus zone, the integration is not executed and the microcomputer 21 waits for the interruption in the step #740 in order to move the photographic lens the rest of the defocus amount. In case the defocus number ERR does not correspond to the value for reaching the narrow in-focus zone, the program goes to the flow CDINT of the focus detection below the step #55 in FIG. 6(a). In case it is detected in the step #705 that the near zone flag NZF is set, the program goes to the flow WNZ3 and it is judged in the step #710 whether or not the moving integration flag NIDF is set, and in case the moving integration flag NIDF is not set, the program goes to the step #735. On the other hand, in case it is detected in the step #710 that the moving integration flag NIDF is set, the program goes to the subroutine of the near zone 3 judgement for judging whether or not the count value ENZCNT of the driving counter is within the defocus pulse number of the near zone 3 (see Table 2).

Figure 19:
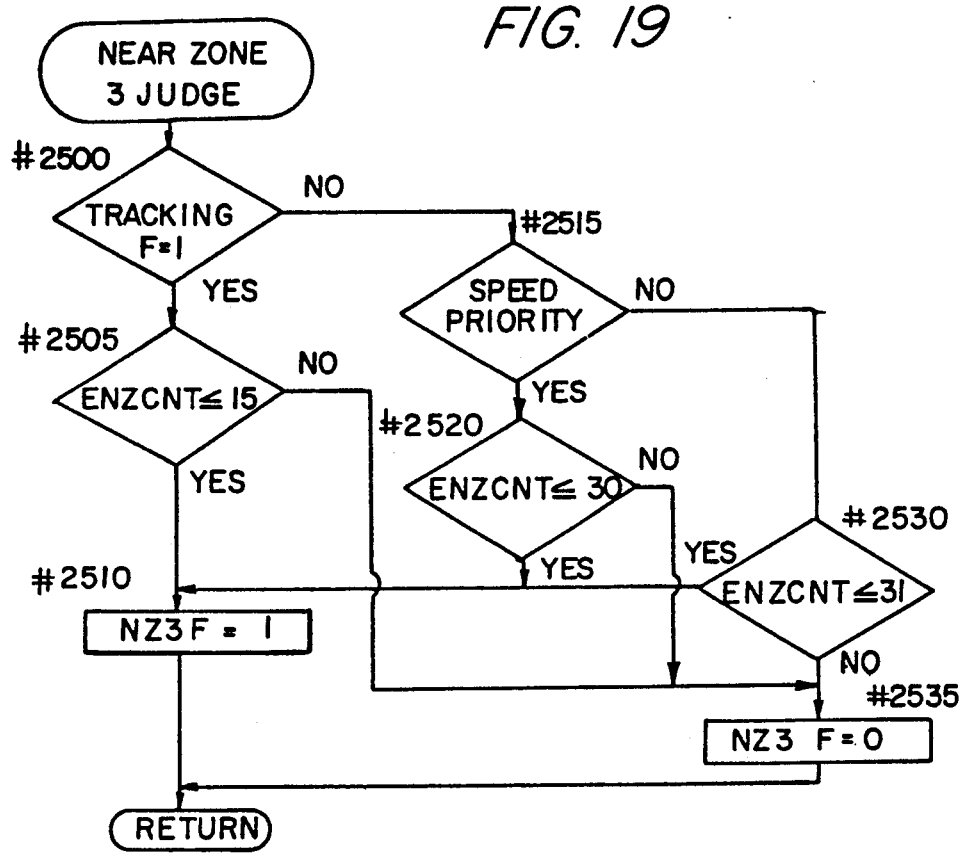

The detailed description of the subroutine of the judgement of the near zone 3 is explained with reference to FIG. 19. First, it is judged in the step #2500 whether or not the tracking flag is set, and in case the tracking flag is set, the value of the count ENZCNT is judged in the step #2505. In case the count value ENZCNT of the driving counter is below 15, the flag NZ3F showing the count value ENZCNT is within the near zone 3 is set in the step #2510 and the program returns. In case the count value ENZCNT is over 15, the flag NZ3F is reset and the program returns (#2500 to #2510, #2535). On the contrary, in case of the speed priority mode in the non-tracking mode in case the count value ENZCNT of the driving counter is below 30, the flag NZ3F is set, and in case the count value ENZCNT is over 30, the flag NZ3F is reset and the program returns. In case of the precision priority mode in the non-tracking mode, in case the count value ENZCNT is below 31, the flag NZ3F is set, and in case the count value ENZCNT is over 31, the flag NZ3F is reset and the program returns.

Going back to FIG. 14, in case the near zone 3 flag NZ3F is not set in the step #715, that is, in case the count value ENZCNT is not in the area of the near zone 3, the program goes back to the step #712, and in case the count value ENZCNT is in the area of the near zone 3 and the flag NZ3F is set, the moving integration flag NIDF is reset in the step #720. Next, it is judged whether the tracking flag is set or not, in case the tracking flag is set or even if in case the tracking flag is not set, the program goes to the step #735 when in the speed priority mode (#725, #727). In case of the precision priority mode, the program repeats the step #727 until the photographic lens is stopped namely until the count value ENZCNT of the driving counter becomes 0. This is because the moving integration can not be executed correctly since the speed of the step driving is not content in the precision priority mode.

Figure 25:
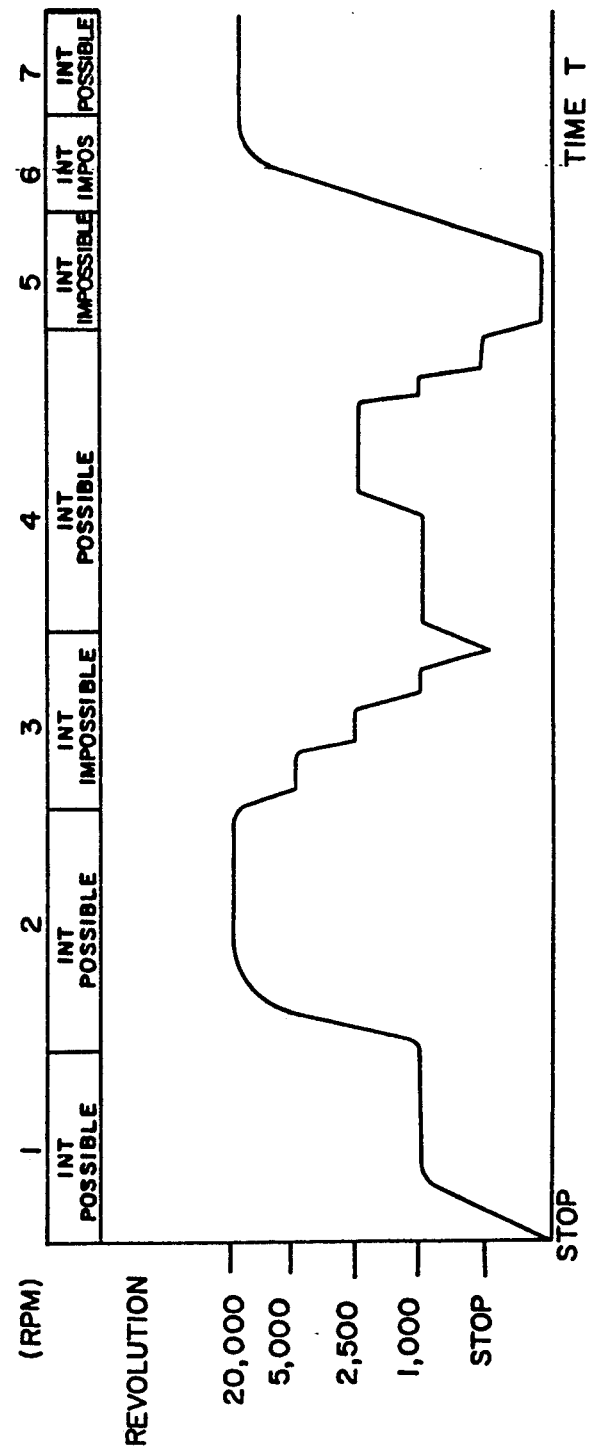
FIG. 25 is a time chart showing the relation between the possibility or impossibility of a movement integration and the motor driving control.

The moving integration is explained with reference to FIG. 25. In FIG. 25 the vertical axis shows the revolutions pf the motor and the horizontal axis shows the time. In the upper portion of FIG. 25, there is shown whether or not the moving integration is possible with respect to the motor condition. In the present embodiment, the moving integration is inhibited in the period of decreasing the motor speed from 20,000 r.p.m. to entering the near zone 3, in the period of the step driving, and in the period of the motor acceleration from the stopped state of the motor M to 20,000 r.p.m. This is because the acceleration and the deceleration are not usually constant and the center point of the moving integration is not clear, therefore the many errors of the focus detection is occurred. On the other hand, when the photographic lens is in the near zone that is in the period of acceleration of the motor M in the near zone, since the motor revolution is slow and the period of the acceleration is short and the error of the focus detection is nearly equal to a few pulses of the encoder, even if the movement integration is executed, there does not occur any problem in practical use. Thus, in the present embodiment the moving integration is enabled for as long a period of time as possible and the necessary time for focus controlling is made short.

Figure 14C:
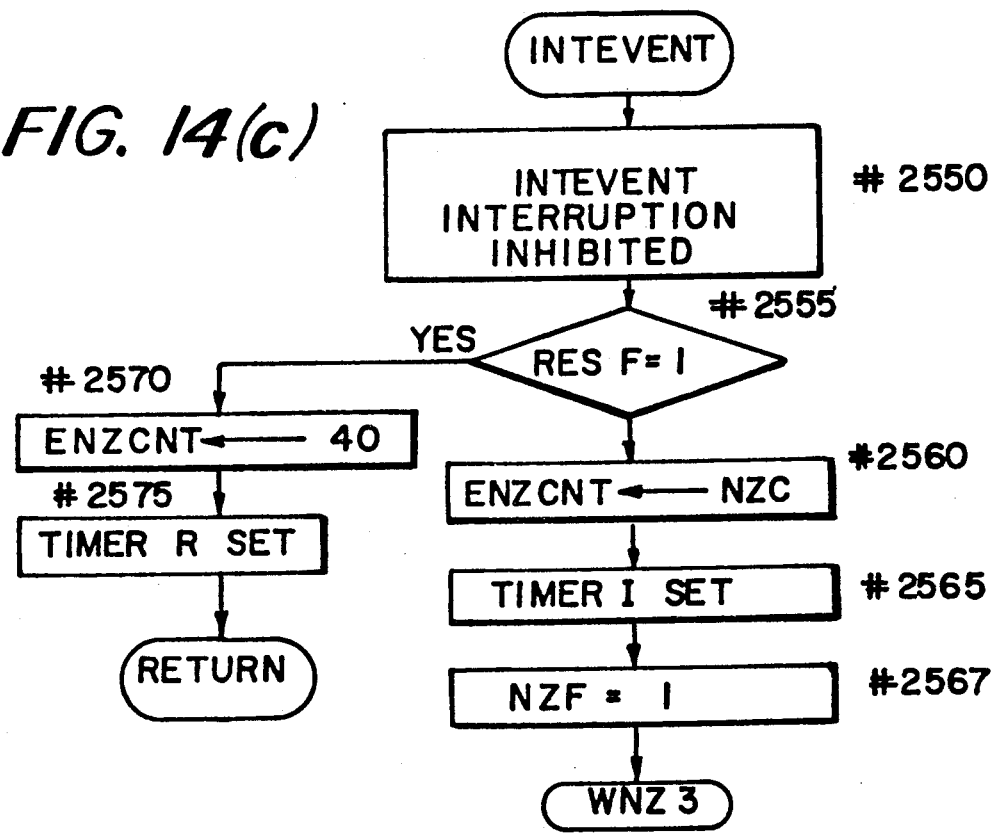

Going to FIG. 14(C), the event counter interruption INTEVENT is explained. The event counter EVENTCNT substracts 1 from the count value every time the pulse is sent from the encoder 31. When the count value of the eventcounter becomes 0, the program goes to the flow of the interruption INTEVENT. In the flow of the interruption INTEVENT, the interruption INTEVENT is inhibited and it is judged by a flag RESF whether the operation of the camera is in the shutter release operation, and in case the flag RESF is set, the count value of the driving counter ENZCNT is set to 40 and the program goes to the subroutine of the timer R set and the revolution of the motor is controlled (#2550, #2555, #2570, #2575). In the step #2555 in case the flag RESF is not set and the camera release is not performed, the count value of the near zone counter NZC is inputted as the count value of the driving counter ENZCNT and the program goes to the subroutine of the timer I set as described below, and after the completion of the subroutine the near zone flag NZF is set and the program goes to the flow WNZ3 (#2560 to #2567).

Figure 16:
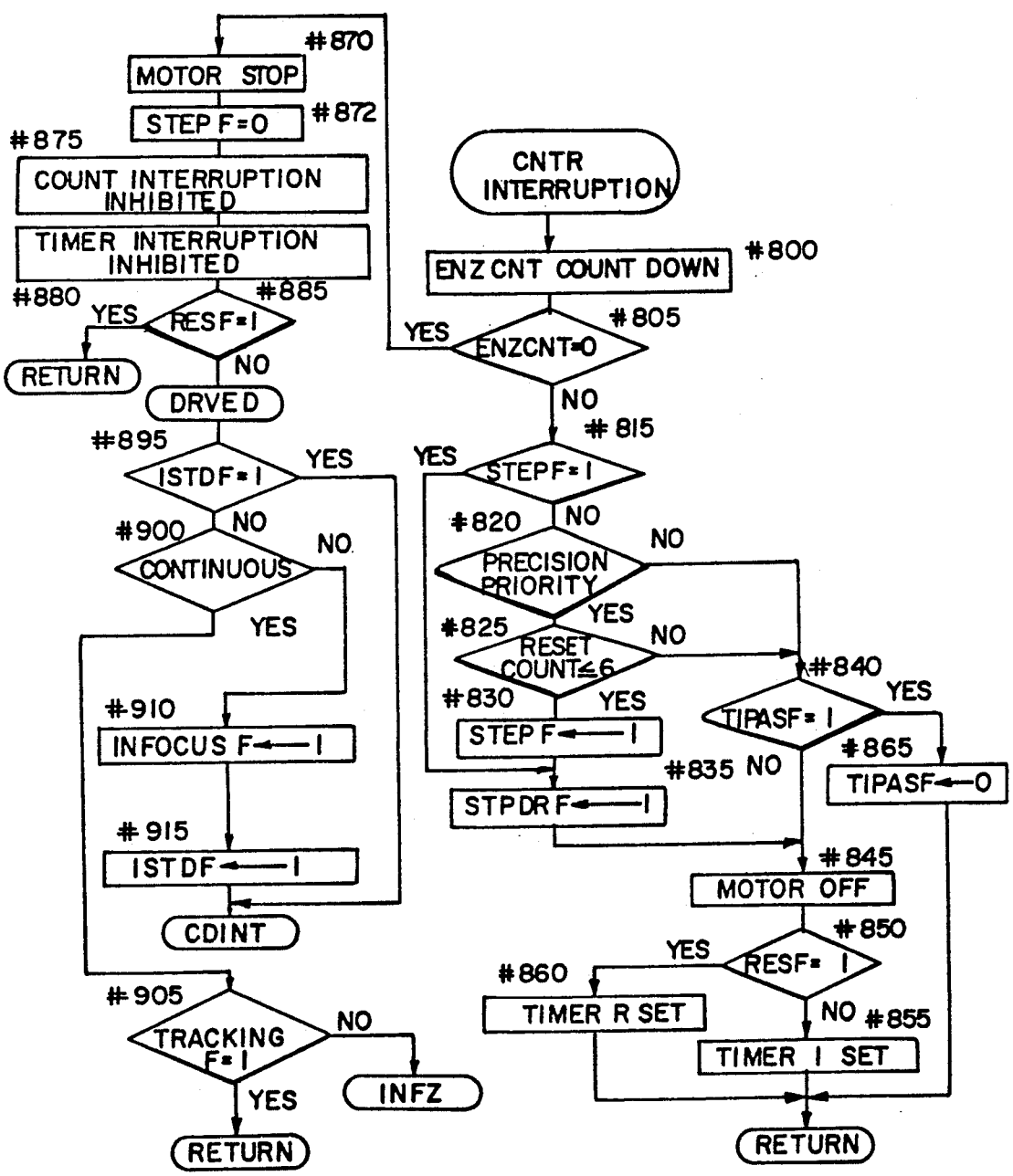

The counter interruption (CNTR interruption) is explained with reference to FIG. 16. The counter interruption is executed every time the pulse is generated from the encoder 31 shown in FIG. 5. In the flow of the counter interruption, the microcomputer 21 subtracts 1 from the count value of of the counter ENZCNT and judges whether or not the count value of the driving counter ENZCNT becomes 0 (#800 to #805). In case the count value of the driving counter ENZCNT is not 0, it is judged in the step #815 whether or not a step mode flag STEPF showing the step driving is set, and in case the flag STEPF is set, the program goes to the step #835. In case the flag STEPF is not set, the program goes to the step #820 and in case the precision priority mode is not selected or in case the count value of the driving counter ENZCNT is over 6 even if the precision priority mode is selected, the step driving is omitted and the program goes to the step #840. Then it is judged whether or not a flag TIPASF showing that the timer interruption is executed before the counter interruption is set, and in case the flag TIPASF is set, the flag TIPASF is reset and the program returns. In case the flag TIPASF is not set, the motor is turned off in the step #845. On the other hand, in case the precision priority mode is selected in the step #820 and the count value of the driving counter ENZCNT is below 6, the program goes to the step #830 from the step #825 and the flag STEPF showing the step mode is set in the step #830 and furthermore the step driving flag STPDRF is set in the step #835 and then the motor M is turned off in the step #845. Next, it is judged in the step #850 whether or not the flag RESF showing the start of shutter release operation is set, and in case the flag RESF is set, the program goes to the subroutine of the timer R set (#860) and in case the flag RESF is not set, the program goes to the subroutine of the timer I and after the completion of the subroutine the program returns. The timer R set routine is explained in the explanation of the shutter release operation.

In the step #805, when the count value of the driving counter ENZCNT becomes 0, that is, when the photographic lens is moved to the in-focus position, the motor M is stopped in the step #870 and the step mode flag STEPF is reset in the step #872 and the timer interruption and the count interruption are inhibited in the steps #875 and #880. In case it is detected in the step #885 that the release flag RESF is set, the program returns, and in case the flag RESF is not set, the program goes to the fiow DRIVED as described below.

In the flow DRIVED, it is judged in the step #895 whether or not there is set a glag 1STDF showing that the program has been passed the DRIVED routine one time under such a condition that the count value of the driving counter ENZCNT becomes 0 in the one shot mode, and in case the flag 1STDF is set, the program goes to the flow CDINT of the focus detection below the step #55 in FIG. 6(a). In case the flag 1STDF is not set in the step #895, the program goes to the step #900 and it is judged in the step #900 from the state of the switch S4 whether the continuous mode or the one shot mode is selected, and in case if the one shot mode is set, the in-focus flag is set in the step #910 and the flag 1STDF showing the one time passage is set in the step #915 and the program goes to the flow of the focus detection. In case the continuous mode is selected in the step #900, it is judged whether the tracking flag is set or not, and in case the tracking flag is set, the program returns and the tracking ability is raised by using the data and by the continuous focus detection. In case the tracking flag is not set, the program goes to the flow INFZ below the step #260 in FIG. 10(a) and the control of the in-focus display etc. is executed (#905).

The timer interruption flow is shown in FIG. 17. The timer interruption is executed in case the pulse from the encoder is not transmitted in the period set in the routine of the timer 1 set. In FIG. 17 the microcomputer 21 checks the flag RESF in the step #950 and judges whether or not the timer interruption is executed during the shutter release operation, and in case the shutter release operation is not performed, the program goes to the subroutine of the timer I set in the step #955 described below. In case the shutter release operation is performed, the program goes to the subroutine of the timer R set in the step #960.

The microcomputer 21 judges the flag STEPF and judges whether the step mode is selected or not, and in case the step mode is not selected, the flag TIPASF showing the timer interruption has been executed is set and the motor is turned on and the program returns (#965 to #975). In case of the step mode it is judged whether the flag STPDRF showing the step driving is done is set or not, and in case the flag STPDRF is set, the motor is switched on and in cases the flag STPDRF is not set, the motor is switched off and the program returns (#975, #980, #985).

Figure 20A:
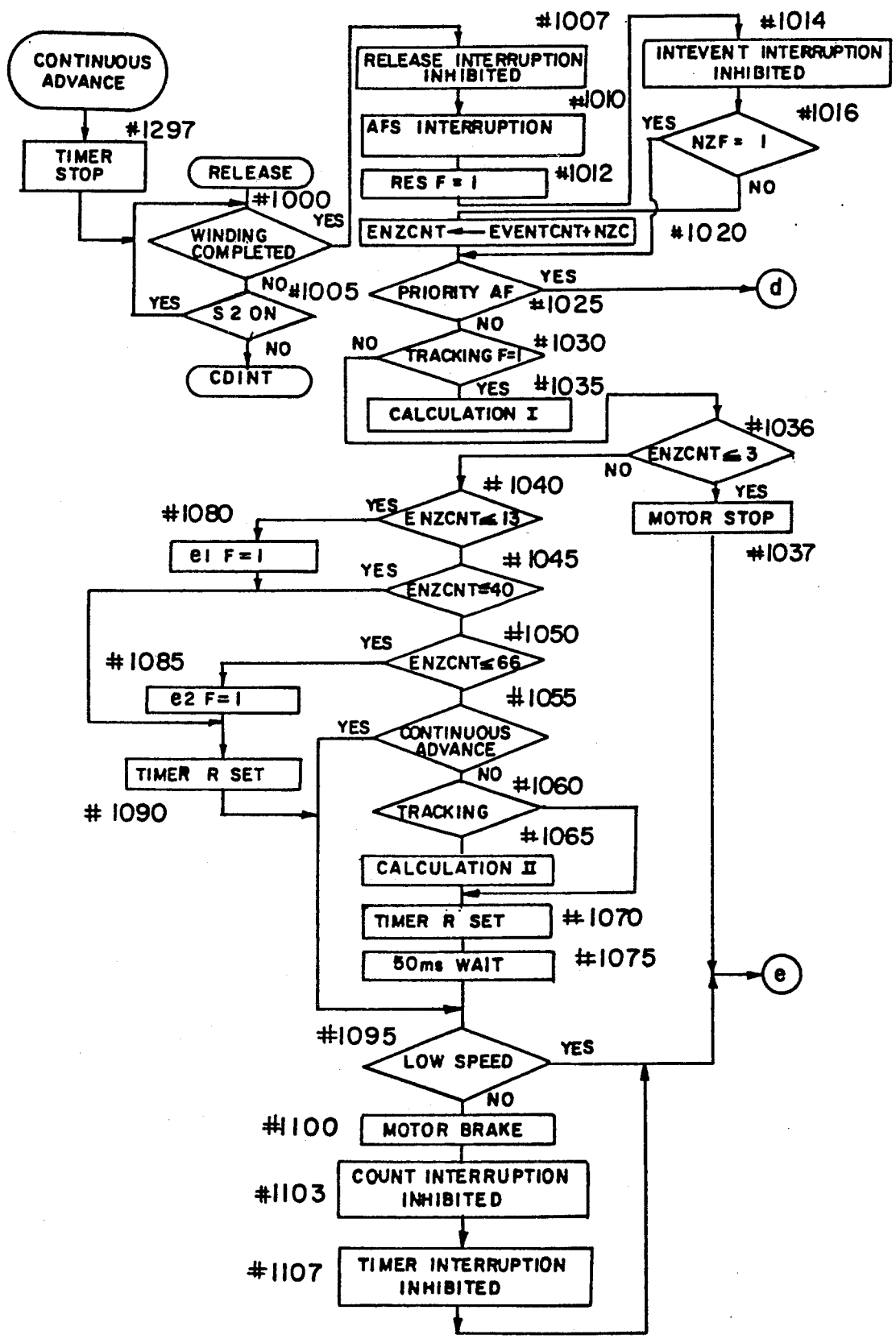

When the release button is depressed to the second stroke and the release switch S2 is turned on during the focus detection or the focus control, the signal to be changed from H to be L is applied to the terminal INT2 of the microcomputer 21 and the release interruption flow is executed as shown in FIG. 20(a). The microcomputer 21 judges whether the winding of the film is completed or not, and in case of the completion of winding the film, the release interruption and the AFS interruption from the step #45 in FIG. 6(a) are respectively inhibited and the release flag RESF showing the release mode is set (#1000 to #1012).

When the winding of the film is not completed in the step #1000, it is judged whether the release switch S2 is turned on or not, and in case of the switch S2 on, the program goes back to the step #1000 and waits for the completion of the film winding. In case of the switch S2 off the program goes to the flow CDINT below the step #55 shown in FIG. 6(a).

When the release flag RESF is set in the step #1012, the interruption INTEVENT for entering from the out zone to the near zone is inhibited and in the step #1016 it is judged whether the near zone flag NZF is set or not. In case the near zone flag is not set in the step #1016, since the count value of the driving counter is not set, the count value of the event center EVENTCNT and the count value NZC of the near zone counter are added and the added amount is used as the count value ENZCNT of the driving counter and the program goes to the step #1025. In the step #1025 the state of the switch S6 is detected and it is judged whether the AF priority mode is selected or not, and in case of the AF priority mode the program goes to the step #1110 and in case of the release priority mode the program goes to the step #1030.

In case of the release priority mode, it is judged whether the tracking mode is selected or not, that is, whether the tracking flag is set or not, and in case of the tracking mode the program goes to the subroutine of the calculation 1 in the step #1035. In the subroutine of the calculation 1 during the release time lag (the period from the time of switch S2 on to the beginning of the actual exposure), the moving amount of the object is presumed and the presumed value is added by the defocus amount before the release mode is performed, whereby the defocus amount can be obtained. The subroutine of the calculation I is shown in FIG. 21.

Figure 21:
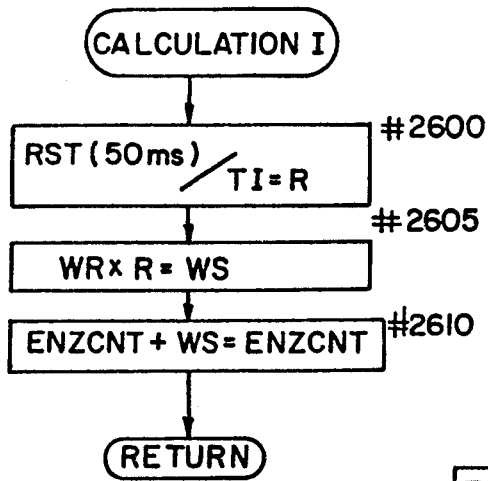

In the subroutine of the calculation I shown in FIG. 21, the movement amount of the object in one of the focus detection period, in other words, the movement inclination of the object to the optical axial direction in the unit focus detection period (defocus amount conversion) is calculated and the movement amount of the object moving during the release time lag (defocus amount conversion) is obtained. In the step #2600, the release time lag RST is divided by the unit focus detection time T1 to obtain the rate R and the movement amount WS during the release time is obtained by multiplying the movement amount WR of the object in the unit time with the rate R. The amount is added to the count value of the driving counter ENZCNT and the new count value of the driving counter ENZCNT is obtained and the program returns (#2600 to #2610).

Figure 20B:
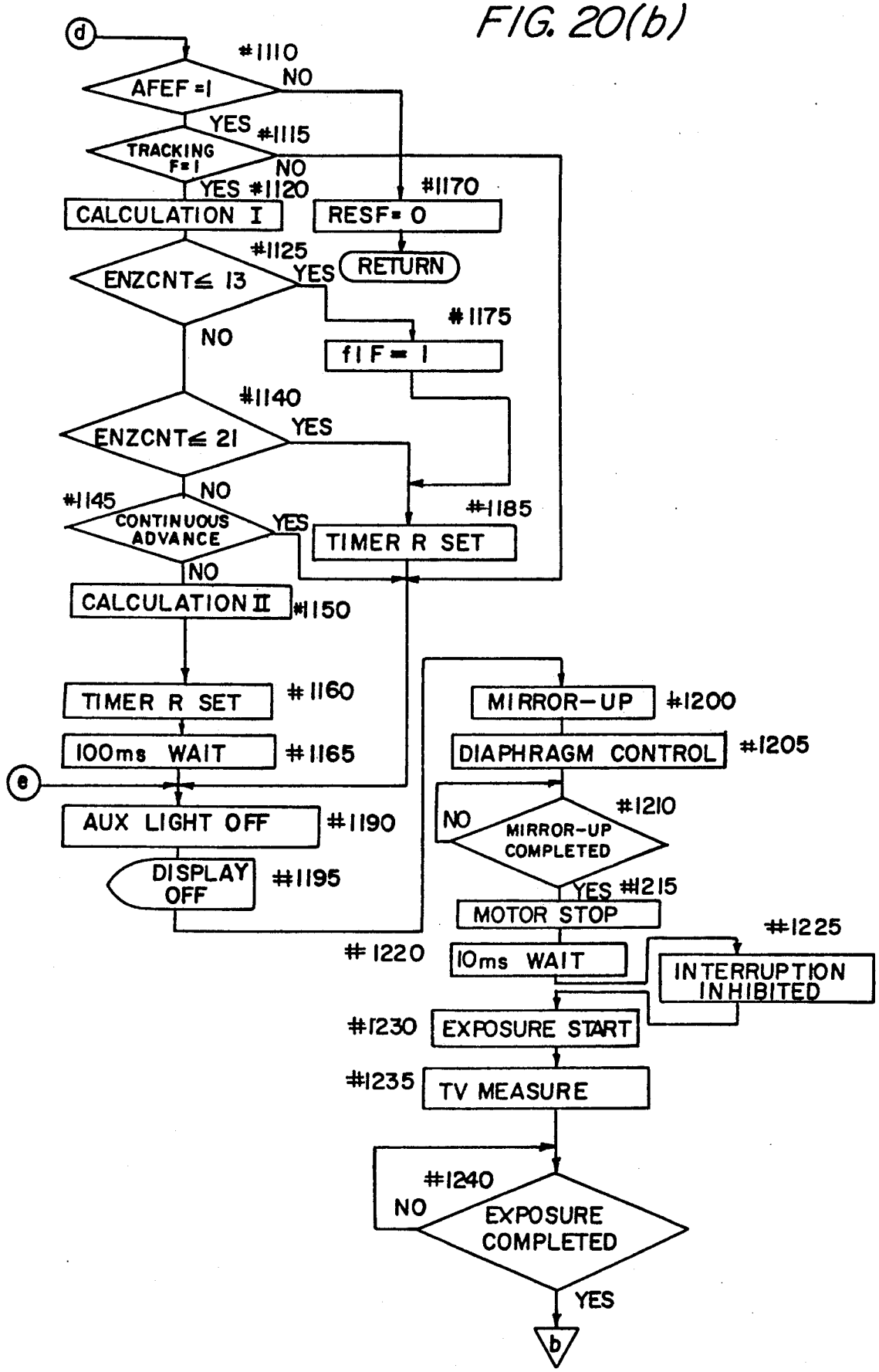

Going back to FIGS. 20(a) and 20(b), in case the tracking mode is not selected in the step #1030, the program skips the subroutine of the calculation I and goes to the step #1036. It is judged whether or not the count value of the driving counter ENZCNT is below 3, and in case the count value is below 3, it is judged the camera is in the in-focus condition and the motor is stopped and the program goes to the step #1190. In case the count value is over 3, the program goes to the step #1040 (#1136, #1137). In the flow below the step #1040 when the shutter release is permitted, the lens is driven during the release time lag. In the step #1040 it is judged whether the count value of the driving counter ENZCNT is below 13 or not, and in case the count value is below 13, the flag e1F for making the motor revolution 1000 r.p.m. is set in the step #1080 and the program goes to the subroutine of #1080 of the timer R set as described below. In case the count value is over 13 and below 40, the program goes to the subroutine of the timer R set (#1045, #1090). In case the count value is over 40 and below 66, the flag e2F for making the motor revolution 5000 r.p.m. is set and the program goes to the subroutine of the timer R set (#1050, #1085, #1090).

Figure 23:
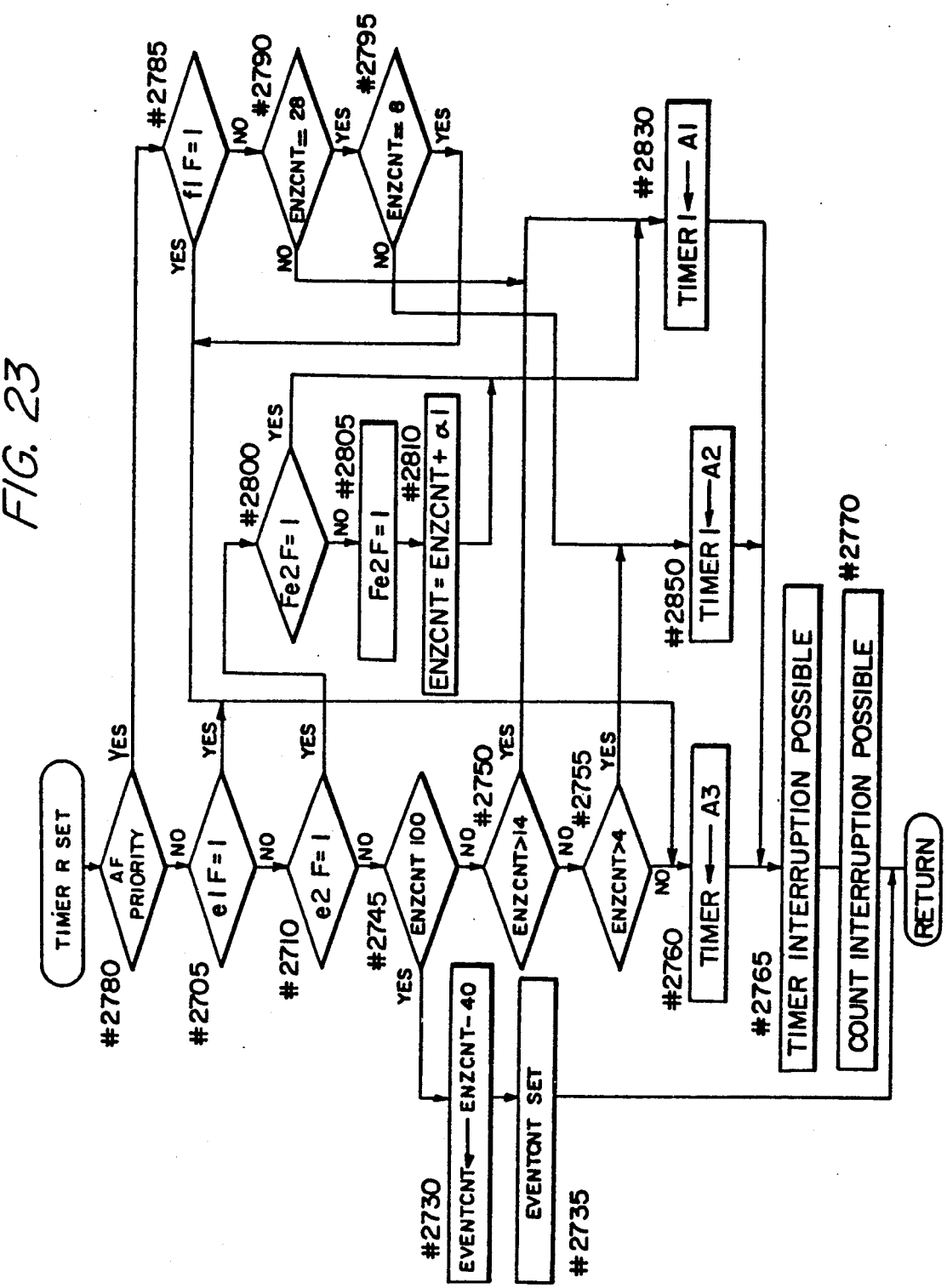

The subroutine of the timer R set shown in FIG. 23 is explained as follows. This is the subroutine for setting the timer which is used for setting the motor revolution in the same manner as the subroutine of the timer 1 set. In the step #2780 it is judged whether or not the AF priority mode is selected, and in case of the AF priority mode the program goes to the step #2785 as described hereinafter. On the other hand, in case of the release priority mode, it is judged whether or not the flag e1F is set, and in case the flag e1F is set, the program goes to the step #2760 and the timer 1 is set to A3 (corresponding to 1000 r.p.m.) and the timer interruption and the count interruption are permitted in the steps #2765 and #2770 and the program returns. In case the flag e1F is not set in the step #2705, it is judged whether or not the flag e2F is set in the step #2710, and in case the flag e2F is set, the program goes to the step #2800 and it is judged whether the flag Fe2F for revising the overshoot amount $\alpha 1$ at the time of stopping the motor is set or not, and in case the flag Fe2F is set, the timer 1 is set to A1 (corresponding to 5000 r.p.m.) in the step #2830 and the program goes to the step #2765. In case the flag Fe2F is not set in the step #2800, the flag Fe2F is set in the step #2805 and an overshoot shift value $\alpha 1$ is added to the count value of the driving counter ENZCNT in the step #2810, and the added value is used as the new count value of the driving counter ENZCNT and the program goes to the step #2830 and the timer 1 is set to A1. The overshoot shift value $\alpha 1$ is used on a ground mentioned below. In case the photographic lens is moved by the motor M rotating at 1000 r.p.m., then the motor is stopped, the overshoot shift value or the offset of the photographic lens against the desired position can be negligibly small. But in case the photographic lens is moved by the motor M rotating at 5000 r.p.m., when the motor M is stopped, the overshoot shift value of the photographic lens against the desired position becomes too large.

The overshoot shift value may be peculiar to the rotation speed but independent of the kind of the photographic lens, therefore by adding the excessive shift value $\alpha 1$ to the count value of the counter ENZCNT, the motor M can be turned off before the lens reaches the in-focus position and the photographic lens can be stopped correctly at the desired in-focus position.

In case the flag e1F and the flag e2F are not set respectively in the step #2705 and #2710, it is judged whether or not the count value of the driving counter ENZCNT is over 100 in the step #2745 and in case the count value is over 100, the count value of the driving counter ENZCNT is subtracted by 40 in the step #2730 and the resultant value is stored in the event counter EVENTCNT then the program goes to the subroutine of the event counter set (EVENTCNT set) in FIG. 14 (b) and returns.

In case the count value of the driving counter ENZCNT is below 100 in the step #2745, the program goes to the step #2750 and it is judged whether the count value of the driving counter ENZCNT is over 14 or not, in case the count value is over 14, the timer 1 is set to A1 (corresponding to 5000 r.p.m.) in the step #2830 and the program goes to the step #2765. In case the count value of the driving counter ENZCNT is below 14 in the step #2750, the program goes to the step #2755 and it is judged whether or not the count value is over 4. In case the count value of the driving counter ENZCNT is below 14 and over 4, the timer 1 is set to A2 corresponding to the rotational speed 2,500 r.p.m. of the motor M and in case the count value is below 4, the timer 1 is set to A3 corresponding to 1,000 r.p.m. in the step 2760 and the timer interruption and the count interruption are permitted respectively in the steps #2765 and #2770 and the program returns.

Going back to FIGS. 20(a) to 20(c), in case it is detected in the step #1050 that the count value of the driving counter ENZCNT is over 66, the count value of the driving counter ENZCNT can not be set 0 when the motor revolution is below 5000 r.p.m., therefore, the release time lag is increased a predetermined time (50 msec. in the present embodiment when in no AF priority mode) so that the motor M can be driven during the increased period. However, in the continuous advance mode, since it is desired that photographing is executed as fast as possible, the predetermined time of the increase of the time lag is not provided in the lens driving. Therefore, in the step #1055 the state of the switches S8 is detected and it is judged whether the continuous advance mode is selected or not, and in case of the continuous advance mode, the program goes to the step #1095. On the other hand, in case the consecutive photographic mode is not selected, the program goes to the step #1060 from the step #1055 and it is judged whether or not the tracking mode is selected, and in case of the tracking mode the program executed the subroutine of the calculation II in order to calculate the movement amount of the object in the predetermined period set in the step #1055 and then goes to the step #1070. On the other hand, in case the tracking mode is not selected in the step #1060, it is judged the object is stopped and the program skips the step #1065 and goes to the step #1070 and the timer is set corresponding to the count value of the driving counter ENZCNT in the subroutine of the timer R set and the lens is moved for 50 msec. (#1060 to #1075).

Figure 22:
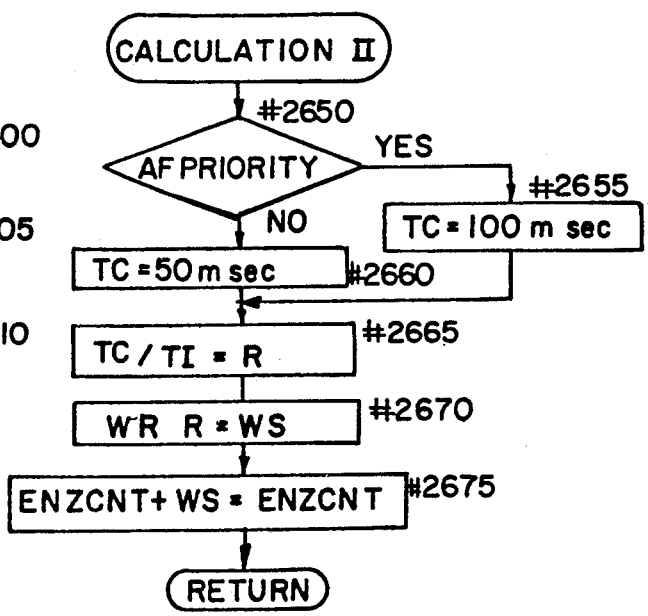

The subroutine of the calculation II in the step #1065 is explained with reference to FIG. 22. In this subroutine, in the step #2650 it is judged whether the AF priority mode is selected or not, and in case of the AF priority mode, the time TC is set 100 msec., and in case of the release priority mode, the time TC is set 50 msec. and the time TC is divided by the unit focus detection time T1 and in the step #2670 rate R is multiplied with the defocus amount (count WR) of the object moving in the period of the unit focus detection and the defocus amount WS of the tracking delay to the exposure is calculated, and in the step #2675 the defocus amount WS is added to the count value of the droving counter ENZCNT, whereby the new count value of the driving counter ENZCNT is obtained and the program returns.

In the step #1095 going from the steps #1055, #1075 or #1090, it is judged whether or not the revolution of the motor M is low (below 5000 r.p.m.), and in case the revolution of the motor M is not low (20,000 r.p.m.), since the motor can not stop immediately even if the signal of the motor stop is generated, the signal of the motor brake is generated (#1095, #1100). The count interruption and the timer interruption are inhibited respectively in the step #1103 and #1107 and the program goes to the step #1190. In case it is detected in the step #1095 that the motor revolution is low, the program directly goes to the step #1190. In case of the AF priority mode in the step #1025, it is judged in the step #1110 whether or not a flag AFEF showing the completion of the focus detection is set and in case the flag AFEF is not set, the release flag RESF is reset in the step #1170 and the program returns.

In the present embodiment even if the focus condition is detected again after the completion of the exposure, when the release button is being depressed, the shutter release operation is not performed and when the release button is depressed again, the shutter release operation is performed. However, in the arrangement that the release flag RESF is not reset in the step #1170, and in the next step of the step #250 it is judged whether the release flag RESF is set or not, and in case the release flag RESF is set, the program goes to the step #1115, the release operation can be executed immediately after focusing of the lens.

In case the flag AFEF is set in the step #1110, it is judged in the step #1115 whether the tracking mode is selected or not, and in case the tracking mode is not selected, the program goes to the step #1190. In case the tracking mode is selected, the distance of the object moving during the shutter release time lag is calculated in the subroutine of the calculation I (shown in FIG. 21) of the step #1120 and in case the count value of the driving counter ENZCNT is below 13, the flag f1F for controlling the motor M with 1000 r.p.m. is set and the program goes to the subroutine of the timer R set in which the timer for controlling the motor revolution is set and goes to the step #1190 (#1120, #1125, #1175, #1185). In case the count value of the driving counter is below 21 in the step #1140, the program goes to the step #1190 through the subroutine of the timer R set of the step #1185. In case the count value of the driving counter ENZCNT is more than 21 in the step #1140, it is judged in the step #1145 whether or not the continuous advance mode is selected and in case the continuous advance mode is selected, the program goes to the step #1190 in order to effect a photographing immediately as described in case of the release priority mode. In case the continuous advance mode is not selected in the step #1145, since the AF priority mode is selected, the movement of the lens is controlled for the predetermined period (100 msec.) in order to move the lens to the in-focus position. That is, it takes 150 msec. of the amount of the release time lag 50 msec. and the predetermined period 100 msec. to move the lens to the in-focus position. Since the tracking mode is selected at the time, the program goes to the subroutine of the calculation II in the step #1150 and the necessary count value of the driving counter ENZCNT is obtained. Then the program goes to the subroutine of the timer R set and waits for 100 msec. in order to control the motor revolution on the basis of the count value of the driving counter ENZCNT (#1150 to #1165).

The operation of the AF priority mode under the timer R set is explained with reference to FIG. 23 as follows. In case of the AF priority mode the program goes to the step #2785 from the step #2780 and in case the flag f1F showing the revolution of 1000 r.p.m. of the motor M is set in the step #2785, the program goes to the step #2760 and the timer 1 is set to the time A3 (corresponding to 1000 r.p.m.). In case the flag f1F is not set in the step #2785, it is judged in the step #2790 whether or not the count value of the driving counter ENZCNT is below 28, and in case the count value is not below 28, the timer 1 is set to the time A1 (corresponding to 5000 r.p.m.). In case the count value of the driving counter ENZCNT is below 8, the program goes to the step #2760 from the step #2795 and the timer 1 is set to the time A3 to control the revolution of the motor M to be 1000 r.p.m.. In case the count value is over 8 and below 28, the program goes to the step #2850 from the step #2795 and the timer 1 is set to the time A2 to control the revolution rate of the motor M to be 2500 r.p.m..

The relation between the revolution rate of the motor M and the pulse number of the encoder and the necessary time for focusing the lens in respective case of the AF priority mode and the release priority mode are shown in table 3. The summary of the relation between the revolution of the motor M and the pulse number is described as follows. Since the AF priority mode is selected, so that the shutter release operation can be executed when the photographic lens is moved to the in-focus condition, the higher focus precision is necessary than in case of the release priority mode and the time during which the motor is rotated 1000 r.p.m. is made long so as to reduce the error of the stop position by the inertia of the motor M.

In the AF priority mode the motor revolution of 20,000 r.p.m. is not adopted but the control method for monitoring the revolution of the motor is adopted so as to improve the focus precision.

On the other hand, in the release priority mode since a quick shutter release is more necessary rather than the precision of the focus detection, thus the setting time of the motor driving in the shutter release is made shorter than in case of the AF priority mode.

Going back to FIG. 20(b), in the step #1190 the auxiliary light emitting device 33 is turned off and the display is turned off in the step #1195. The mirror-up starting signal and the aperture control signal are transmitted to the exposure control circuit 22 and then the mirror-up operation and the aperture control with the predetermined value Av are executed in the steps #1200 and #1205, then the program waits for the completion of the mirror-up operation in the step #1210. The time of the mirror-up operation is nearly 50 msec. When the mirror-up operation is completed, the motor stopping signal is generated and the program waits for 10 msec. till the motor is stopped and the interruptions are inhibited and the exposure starting signal is generated and the running of the first shutter curtain of focal plane shutter is started in the steps #1215 to #1230. Then the exposure time Tv is measured and when the exposure time Tv is lapsed, the exposure ending signal is generated and the program waits till the second shutter curtain is closed in the steps #1235 and #1240.

Figure 20C:
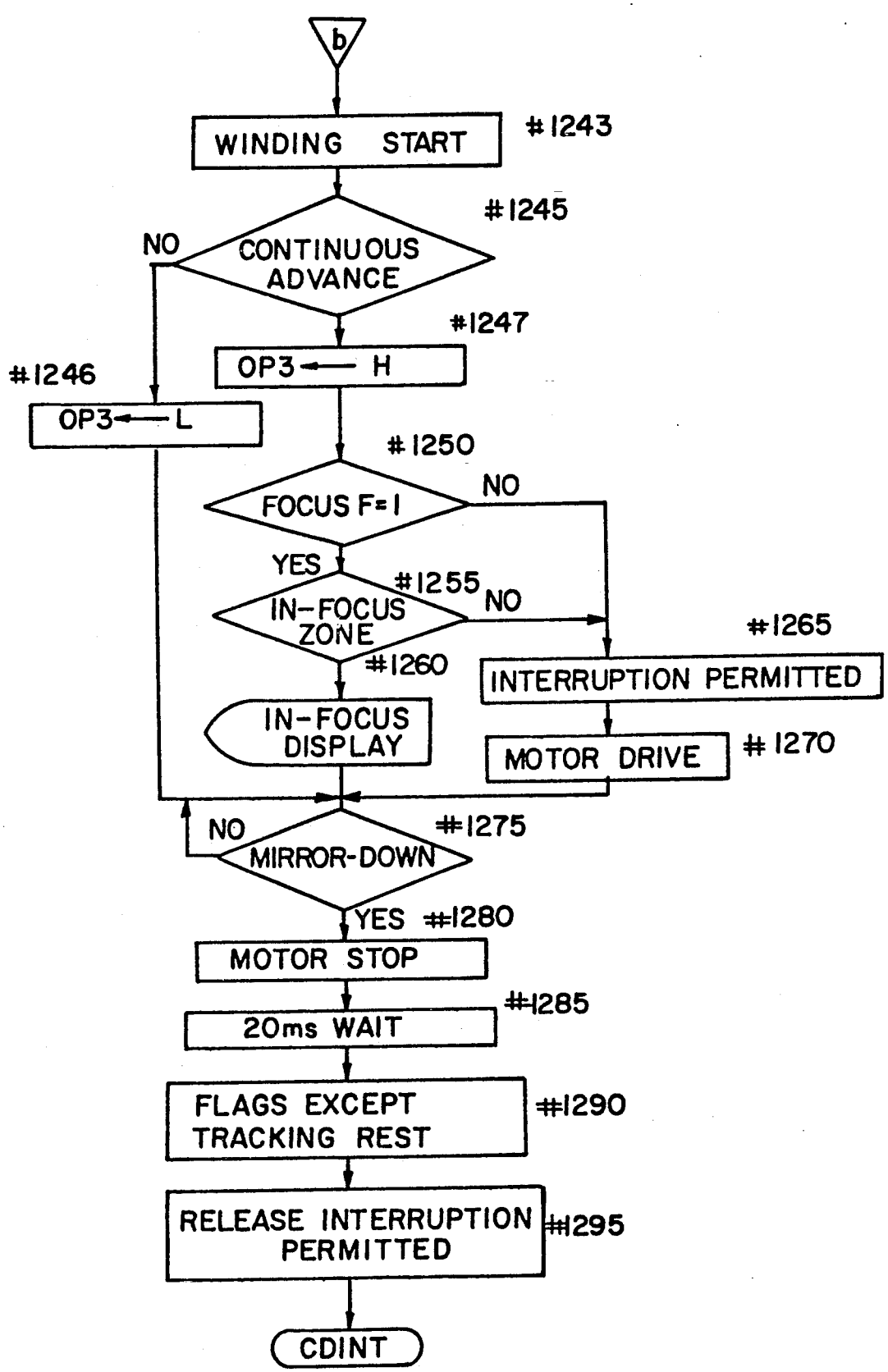

Next in FIG. 20(c), the microcomputer 21 generates the signal for starting winding one frame of the photographic film and executes the one frame winding operation of the film in the step #1243. Then it is judged in the step #1245 whether or not the continuous advance mode is selected. In case the continuous advance mode is not selected, the terminal OP3 is changed to L level in order to prevent the continuous photographing and the program goes to the step #1275. On the other hand, in case of the continuous advance mode, the terminal OP3 is changed to H level in the step #1247 and the timer starting signal is generated in the timer circuit 35 in FIG. 5. In case the in-focus flag is not set or the lens is not in the in-focus zone, the counter interruption and the timer interruption are permitted and the motor M is driven so as to drive the rest count value of the driving counter ENZCNT and the program goes to the step #1275 through the steps #1255, #1265, #1270. In case the AF operation is completed in this process, the program goes back to the step #1275 from the step #885 again and loops the step #1275 shown in FIG. 20(c). In case the in-focus flag is set and the lens is in the in-focus zone, the in-focus display is executed in the step #1260 and then the program goes to the step #1275 and waits for the mirror-down is completed.

When the mirror-down is completed, the signal for stopping the motor for driving the lens is generated and the program waits for 20 msec. till the motor is stopped in the step #1285. The flags except the tracking flag are reset in the step #1290, and the release interruption is permitted in the step #1295 and the program goes back to the flow CDINT below the step #55 in FIG. 6(a). However, the steps #1280 and #1285 are not essentially necessary and the program may go back to the flow CDINT with the lens driving.

In the present embodiment, in case the release button is continuously depressed when the continuous advance mode is set, the terminal OP3 is changed to H level and the timer circuit 35 starts the time measurement and the signal for changing to L level after the predetermined intervals is applied to the terminal INT4 of the microcomputer 21. When the signal mentioned above is applied, the microcomputer 21 starts again the interruption below the step #1297 in FIG. 20(a) and the L level signal is generated from the terminal OP3 in the step #1297 in order to stop the timer circuit 35 and also the operation in the release flow beginning from the step #1000 is executed in the same way mentioned above.

Figure 24:
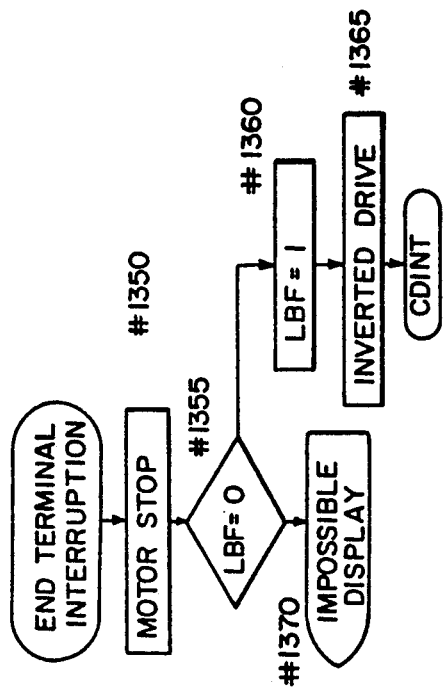

Next, the flow of the end terminal interruption is explained with reference to FIG. 24. This operation is executed when the photographic lens reaches the end terminal without detecting the sufficient contrast level for the focus detection during detection of the contrast of the object with the photographic being driven under the low contrast scanning. For the detection of the end terminal, the switches S7 are provided on both sides of the lens shiftable range and one of the switches S7 is turned on when the photographic lens reaches the end terminal of either the closest focusing position or the infinite focusing position and the signal changing to L level from H level is applied to the terminal INT3 of the microcomputer 21, which executes the flow of the end terminal interruption in FIG. 24. In this flow, the motor M is stopped in the step #1350 and it is judged in the step #1355 whether or not a flag LBF for shifting the photographic lens in the backward direction is set, and in case the flag LBF is not set, it is detected that the photographic lens reaches the end terminal of the projected position, then flag LBF is set in the step #1360 and the motor is started in the reversed direction in the step #1365 and the program goes to the flow CDINT in FIG. 6. In case the flag LBF is set in the step #1355, it is detected that after the lens goes and returns one time, the photographic lens reaches the end terminal, wherein the contrast detection is impossible and the microcomputer 21 operates to display that the focus detection is impossible.

Although detail of the embodiment of the present invention is explained with reference to a preferred embodiment, various variations can be made as described hereinafter.

(1) The stage of driving the photographic lens under the revolution of 20,000 r.p.m. of the motor M may be omitted during the shutter release operation in the release priority mode.

(2) A shutter release lock may be used in the AF priority mode in case the count value of the driving counter ENZCNT does not become 0 for a predetermined time period.

(3) In the AF priority mode and the precision priority mode in the shutter release operation, the revolution of the motor M may be only 1000 r.p.m. and the shutter release may be effected only in case the count value of the driving counter ENZCNT is 0, that is, in case the count value of the center ENZCNT is not 0, the shutter release is locked so as to improve the focus precision.

Figure 26A:
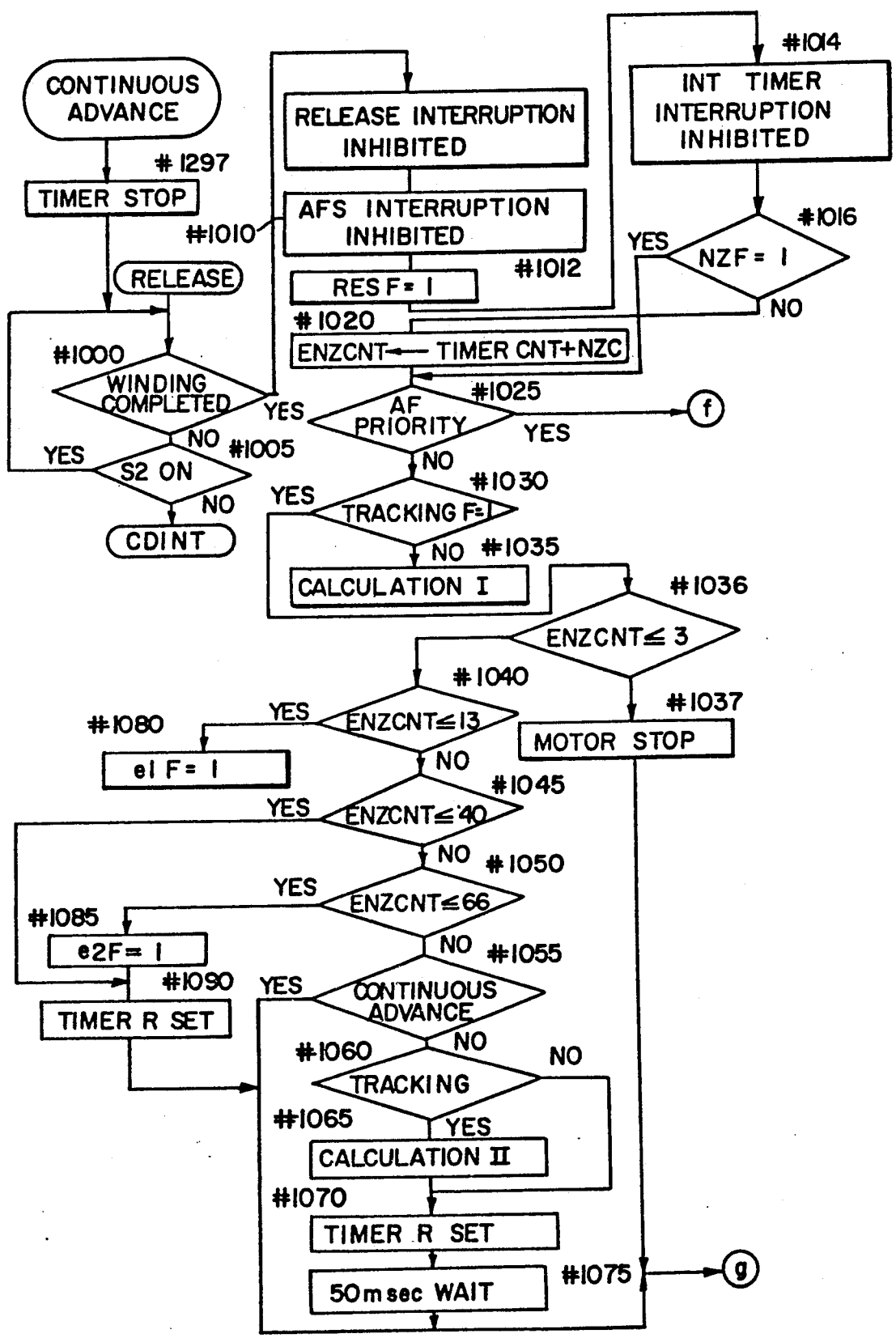
FIGS. 26(a) and 26(b) and 27 are flow charts showing the variations.
Figure 26B:
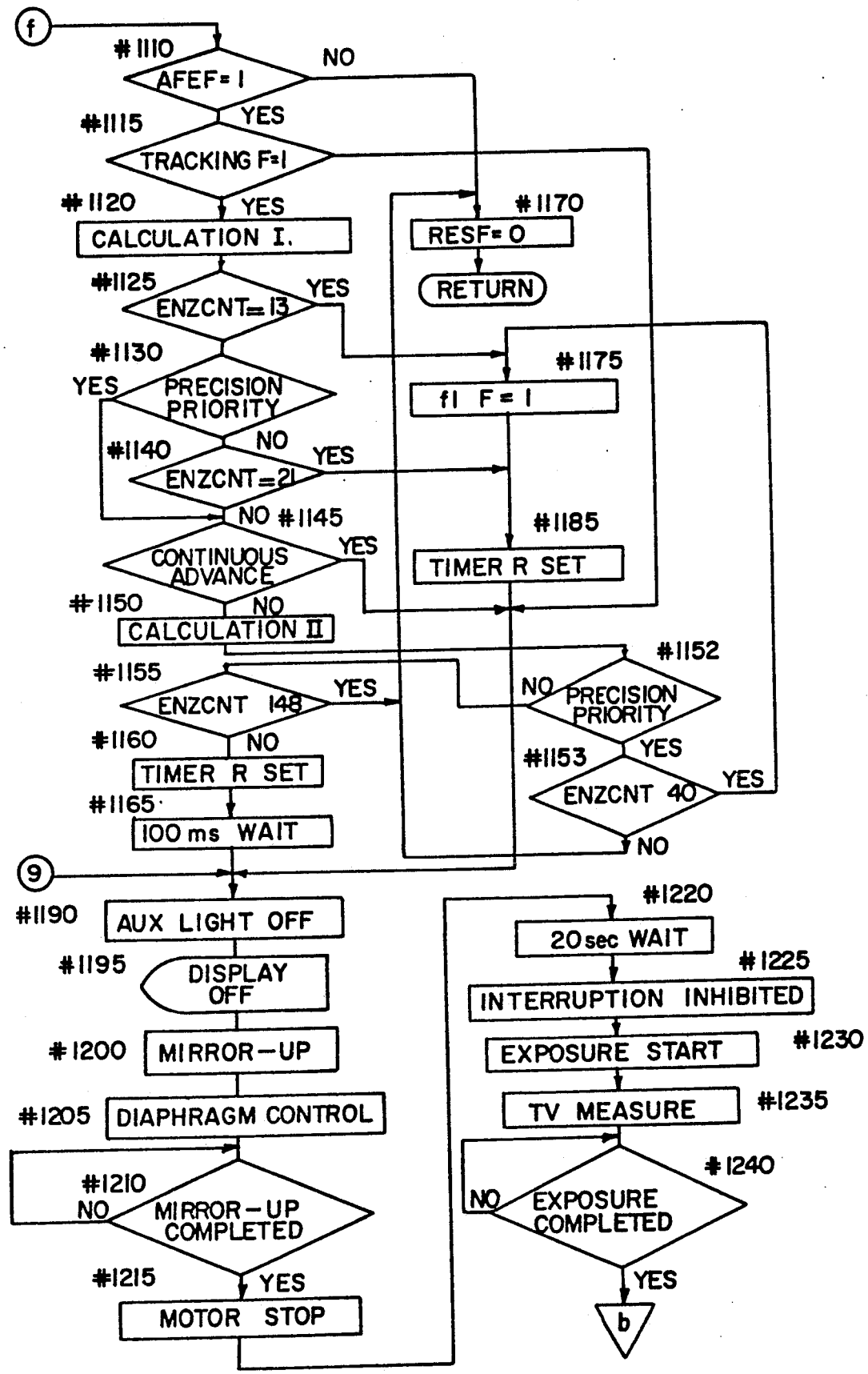

The variations mentioned above are explained with reference to FIGS. 26 (a) and 26(b) the different points of which are mentioned below.

The variation (1) is obtained by omitting the step #1095 to #1107 in FIG. 20(a). This is because the high speed revolution of 20,000 r.p.m. of the motor M is omitted. Moreover, the variation (1) is obtained by omitting the steps #2730, #2735 and #2745 in FIG. 23. This is also because the high speed mode is omitted. Furthermore, the steps #2555, #2570 and #2575 in the flow INTEVENT are omitted.

The variation (2) is obtained as follows. There is a step #1155 between the step #1150 and the step #1160 in FIG. 20(b) for judging whether or not the count value of the driving counter ENZCNT is over 148. In case the count value is over 148, the program goes to the step #1170 and the release flag RESF is reset and the program returns. The count value 148 is explained with reference to Table 3. Since it takes 60 msec. below the pulse number 28, the drivable time of 5000 r.p.m. of the motor is 90 msec., the value of 150 msec. subtracted by 60 msec., and then the drivable pulse number is 120 (=4/3×90) and the number 148 is obtained by the calculation (120+28=148).

The variation (3) is obtained as follows. The step #1130 for judging whether the precision priority mode is set or not is provided after the step #1125 in FIG. 20(b). In case of the precision priority mode the program goes to the step #1145 in order to inhibit the modes except 1000 r.p.m.. Moreover, the step #1152 for judging whether the precision priority mode is set or not is provided after the step #1150, and in case of the precision priority mode the step #1153 for judging whether or not the count value the driving counter ENZCNT is below 40 (150 msec. ×4/15(1000 r.p.m.)) is provided, and in case the count value is below 40, the program goes to the step #1175 in order to set the flag f1F indicating the driving of 1000 r.p.m. and processes below the step #1175. In case the count value is over 40, the release flag RESF is reset in the step #1170 and the program returns. In case the precision priority mode is not set in the step #1152, the program goes to the step #1155 and executes the flow below the step #1155.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

TABLE 1

| AF mode | F number less than 1.7 value K | | F number more than 1.7 value K | | AE Mode |
|---|---|---|---|---|---|
| | small | great | small | great | |
| continuous mode | P.O. P.P. | P.P S.P. | S.P. S.P. | S.P. S.P. | A mode P mode S mode M mode |
| one shot mode | P.P. P.P. | P.P P.P. | P.P. S.P. | S.P. S.P. | A mode P mode S mode M mode |

P.P.-precision priority mode
S.P.-Speed priority mode

TABLE 2

| zone | motor M speed RPM | defocus pulse number speed priority | | |
|---|---|---|---|---|
| | | non tr. | precision tracking | priority non tr. |
| out zone | 20,000 | 101– | 64– | 120– |
| near zone 1 | 5,000 | 62–100 | 32–63 | 80–120 |
| near zone 2 | 2,500 | 31–61 | 16–31 | 32–79 |
| near zone 3 | 1,000 | –30 | –15 | 7–31 |
| step | | / | / | –6 | non tr.-non tracking

TABLE 3

| motor M RPM | 16 pulses per one rotation encoder pulse Num./msec |
|---|---|
| 1,000 | 4/15 |
| 2,500 | 2/3 |
| 5,000 | 4/3 |
| 20,000 | 16/3 |

| mode condition | AF priority | | | release priority | | |
|---|---|---|---|---|---|---|
| | pulse number | RPM | time (msec) | pulse Num. | RPM | time (msec) |
| e1F = 1 f1F = 1 | ≦13 | 1,000 | ≈49 | ≦13 | 1,000 | ≈49 |
| e2F = 1 | / | / | / | ≦66 | 5,000 | ≈50 |
| ENZCNT ≦4 | / | / | / | ≦4 | 1,000 | 15 |
| ENZCNT ≦8 | ≦8 | 1,000 | 30 | ↓ | ↓ | ↓ |
| ENZCNT ≦13 | ↓ | ↓ | ↓ | ≦13 | 2,500 | ≈29 |
| ENZCNT ≦21 | ≦21 | 2,500 | ≈50 | ↓ | ↓ | ↓ |

TABLE 3-continued

| ENZCNT ≤28 | ≤28 | ↑ | 60 | } | ↓ | } |
|---|---|---|---|---|---|---|
| ENZCNT ≤40 | { | ↓ | { | ≤40 | 5,000 | 50 |
| | | | | | | } |
| ENZCNT ≤100 | | | | ≤100 | ↑ | 95 |
| ENZCNT >100 | } | 5,000 | } | | 20,000 | } |

What is claimed is:

1. An automatic focusing device, comprising:

an objective lens, at least a part of which is movable along the optical axis of the objective lens in a focusing operation;

means for storing electric charges corresponding to an image formed by said objective lens;

means for calculating defocus of said objective lens with respect to a predetermined focal plane on the basis of the electric charges stored in said storing means;

means for driving said part of the objective lens in accordance with the defocus calculated by said calculating means; and control means for selecting any one of modes consisting of a first mode and a second mode, the first mode for permitting the operation of said storing means while varying the speed of said part of the objective lens driven by said driving means, the second mode for inhibiting the operation of said storing means while varying the speed of said part of the objective lens driven by said driving means.

2. The automatic focusing device as claimed in claim 1, wherein said first mode is selected when the driving speed of said part of the objective lens is accelerated and said second mode is selected when the driving speed of said part of the objective lens is decelerated.

3. The automatic focusing device as claimed in claim 1, wherein said driving means further comprises means for varying the driving speed from the first driving speed to the second driving speed, and wherein said control means selects the first mode when the difference between the first and second driving speeds is smaller than a predetermined value and selects the second mode when the difference between the first and second driving speeds is larger than the predetermined mode.

4. The automatic focusing device as claimed in claim 3, wherein said second speed is determined on the basis of said defocus amount.

5. An automatic focusing device, comprising:

an objective lens, at least a part of which is movable along the optical axis of the objective lens in a focusing operation;

means for storing electric charges corresponding to an image formed by said objective lens;

means for calculating the defocus amount of said objective lens with respect to a predetermined focal plane on the basis of the electric charge stored in said storing means;

first means for driving said part of the objective lens in accordance with the defocus amount calculated by said calculating means;

means for comparing said calculated defocus amount with a predetermined amount to produce a signal when said calculated defocus amount is smaller than said predetermined amount;

means for repeatedly operating said storing means, said calculating means, and said driving means when said signal is not produced;

means for interrupting the operation of said storing means when said signal is produced, and second means for driving said part of the objective lens in accordance with the defocus amount previously calculated by said calculating means when said signal is produced.

6. The automatic focusing device as claimed in claim 5, wherein said second means intermittently drives said driving means.

7. An automatic focusing device, comprising:

an objective lens, at least a part of which is movable along the optical axis of the objective lens in a focusing operation;

means for storing electric charges corresponding to an image formed by said objective lens;

means for calculating defocus of said objective lens with respect to a predetermined focal plane on the basis of the electric charges stored in said storing means;

means for storing said defocus calculated by said calculating means;

means for updating the contents of said storing means based on the calculated defocus amount by repeating the operation of said storing means and said calculating means;

means for driving said part of the objective lens in accordance with the defocus stored in said storing means; and control means for selecting any one of modes consisting of a first mode and a second mode, the first mode for permitting the operation of said updating means while varying the speed of said part of the objective lens driven by said driving means, the second mode for inhibiting the operation of said updating means while varying the speed of said part of the objective lens driven by said driving means.

8. The automatic focusing device as claimed in claim 7, wherein said first mode is selected when the driving speed of said part of the objective lens is accelerated and said second mode is selected when the driving speed of said part of the objective lens is decelerated.

9. The automatic focusing device as claimed in claim 7, wherein said driving means further comprises means for varying the driving speed from the first driving speed to the second driving speed, and wherein said control means selects the first mode when the difference between the first and second driving speeds is smaller than a predetermined value and selects the second mode when the difference between the first and second driving speeds is larger than the predetermined value.

10. The automatic focusing device as claimed in claim 9, wherein said second speed is determined on the basis of said defocus amount.

11. An automatic focusing device, comprising:

an objective lens, at least a part of which is movable along the optical axis of the objective lens in a focusing operation;

means for storing electric charges corresponding to an image formed by said objective lens;

means for calculating the defocus amount of said objective lens with respect to a predetermined focal plane on the basis of the electric charge stored in said storing means;

means for updating the contents of said storing means based on the calculated defocus amount by repeating the operation of said storing means and said calculating means;

first means for driving said part of the objective lens in accordance with the defocus amount stored in said storing means;

means for comparing said calculated defocus amount with a predetermined amount to produce a signal when said calculated defocus amount is smaller than said predetermined amount; and control means for controlling the operation of said updating means in a manner that, the operation of said updating means is permitted when said signal is not produced and the operation of said updating means is inhibited when said signal is produced.

12. The automatic focusing device as claimed in claim 11, further comprising drive control means for intermittently driving said driving means when said signal is produced.

* * * * *